United States Patent
Zhang et al.

(10) Patent No.: US 9,179,481 B2
(45) Date of Patent: *Nov. 3, 2015

(54) METHODS AND APPARATUSES FOR MANAGING SIMULTANEOUS UNICAST AND MULTICAST/BROADCAST SERVICES IN A WIRELESS COMMUNICATION SYSTEM

(71) Applicant: QUALCOMM Incorporated, San Diego, CA (US)

(72) Inventors: Xiaoxia Zhang, San Diego, CA (US); Peter Gaal, San Diego, CA (US); Andrea Garavaglia, Nuremberg (DE); Jun Wang, Poway, CA (US); Gordon Kent Walker, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/593,541

(22) Filed: Jan. 9, 2015

(65) Prior Publication Data

US 2015/0139063 A1 May 21, 2015

Related U.S. Application Data

(63) Continuation of application No. 13/457,370, filed on Apr. 26, 2012.

(60) Provisional application No. 61/481,064, filed on Apr. 29, 2011.

(51) Int. Cl.
*H04H 20/71* (2008.01)
*H04W 76/00* (2009.01)
(Continued)

(52) U.S. Cl.
CPC .......... *H04W 76/002* (2013.01); *H04L 12/1881* (2013.01); *H04L 12/1886* (2013.01); *H04W 4/06* (2013.01); *H04W 88/06* (2013.01); *H04W 88/08* (2013.01)

(58) Field of Classification Search
None
See application file for complete search history.

(56) References Cited

U.S. PATENT DOCUMENTS 8,098,621 B2 1/2012 Beale
2002/0141357 A1 10/2002 Park et al.
(Continued)

FOREIGN PATENT DOCUMENTS

JP 2007110758 A 4/2007
JP 2010529713 A 8/2010
(Continued)

OTHER PUBLICATIONS

3GPP TS 25.331: "3rd Generation Partnership Project; Technical Specification Group Radio Access Network; Radio Resource Control (RRC); Protocol specification," 650 Route Des Lucioles-Sophia-Antipolis Cedex; France, Version 10.3.0, Release 10, Mar. 2011, pp. 1-2, 122-127, 355-361, 427, 527-547, 582-596, 775, 785, 815, 889-892,988, 1124-1134, 1591-1592, 1613 and 1777.

(Continued)

*Primary Examiner* — Chi H Pham
*Assistant Examiner* — Raul Rivas
(74) *Attorney, Agent, or Firm* — Novak Druce Connolly Bove + Quigg LLP

(57) ABSTRACT

Techniques are provided for managing simultaneous unicast and multicast/broadcast services. For example, there is provided a method operable by a user equipment (UE) or the like, that involves transmitting, upon initial connection with a wireless communication system, a first message indicating one or more capabilities of the UE. The method may further involve transmitting a second message indicating that the UE is receiving or is about to receive a multicast/broadcast service. The method may also involve receiving, as a result of the second message, data scheduled in accordance with one or more predetermined rules.

27 Claims, 18 Drawing Sheets

(51) Int. Cl.
*H04L 12/18* (2006.01)
*H04W 4/06* (2009.01)
*H04W 88/06* (2009.01)
*H04W 88/08* (2009.01)

(56) References Cited

U.S. PATENT DOCUMENTS

| | | |
|---|---|---|
| 2006/0251032 A1 | 11/2006 | Roy et al. |
| 2008/0070556 A1 | 3/2008 | Bhattacharjee et al. |
| 2008/0198797 A1 | 8/2008 | Park et al. |
| 2008/0268878 A1 | 10/2008 | Wang et al. |
| 2008/0318586 A1 | 12/2008 | Niwano et al. |
| 2010/0061285 A1 | 3/2010 | Maeda et al. |
| 2010/0191965 A1 | 7/2010 | Fischer et al. |
| 2011/0286420 A1 | 11/2011 | Cho et al. |
| 2011/0300867 A1 | 12/2011 | Matsuo et al. |
| 2012/0002614 A1 | 1/2012 | Ekici et al. |
| 2012/0275369 A1 | 11/2012 | Zhang et al. |
| 2013/0083720 A1 | 4/2013 | Wang et al. |

FOREIGN PATENT DOCUMENTS

| | | |
|---|---|---|
| WO | 2008033914 A2 | 3/2008 |
| WO | 2008141003 A2 | 11/2008 |

OTHER PUBLICATIONS

3GPP TS 36.306: "3rd Generation Partnership Project; Technical Specification Group Radio Access Network; Evolved Universal Terrestrial Radio Access (E-UTRA); User Equipment (UE) radio access acapabilities," 650 Route Des Lucioles-Sophia-Antipolis Cedex; France, Version V10.1.0, Release 10, Apr. 5, 2011, pp. 1-18.
3GPP TS 36.331 V10.1.0 (Mar. 2011) 3rd Generation Partnership Project; Technical Specification Group Radio Access.Network; Evolved Universal Terrestrial Radio Access (E-UTRA); Radio Resource Control (RRC); Protocol specification (Release 10), 290 pages.
3rd Generation Partnership Project ; Technical Specification Group Services and System Aspects; General Packet Radio Service (GPRS) enhancements for Evolved Universal Terrestrial Radio Access Network (E-UTRAN) access (Release 10), 3GPP Standard; 3GPP TS 23.401, 3rd Generation Partnership Project (3GPP), Mobile Competence Centre ; 650, Route Des Lucioles ; F-06921 Sophia-Antipolis Cedex ; France, No. V10.3.0, Mar. 2011, pp. 1-278, XP050476358, p. 27, paragraph 4.3.7—p. 31.
3rd Generation Partnership Project; Technical Specification Group Radio Access Network; Evolved universal terrestrial Radio Access (E-ultra) and evolved universal terrestrial radio access network (E-Utran); overall description; stage 2 (Release 10), 3Gpp Standard; 3GPP TS 36.300, 3rd Generation Partnership Project (3GPP), Mobile competence centre; 650, Route Deslucioles; F-06921 Sophia-Antipolis cedex; France, No. V10.3.0, Apr. 5, 2011, pp. 1-197, XP050477175.
International Search Report and Written Opinion—PCT/US2012/035430—ISA/EPO—Jul. 19, 2012.
Martinovic, et al., "Measurement and Analysis of Handover Latencies in IEEE 802.11i Secured Networks," In Proceedings of the 13th European Wireless Conference (EW2007), Paris, France. Apr. 2007, pp. 1-7.
NEC, "Change of UE capability with ongoing service," R2-073549,3GPP, Aug. 27, 2007.

METHODS AND APPARATUSES FOR MANAGING SIMULTANEOUS UNICAST AND MULTICAST/BROADCAST SERVICES IN A WIRELESS COMMUNICATION SYSTEM

CROSS-REFERENCE TO RELATED APPLICATION

The present application for patent is a Continuation of U.S. Non-Provisional application Ser. No. 13/457,370, filed Apr. 26, 2012, entitled "METHODS AND APPARATUSES FOR MANAGING SIMULTANEOUS UNICAST AND MULTICAST/BROADCAST SERVICES IN A WIRELESS COMMUNICATION", which claims priority to Provisional Application No. 61/481,064, filed Apr. 29, 2011, entitled "METHODS AND APPARATUSES FOR MANAGING SIMULTANEOUS UNICAST AND MULTICAST/BROADCAST SERVICES IN A WIRELESS COMMUNICATION SYSTEM", both of which are assigned to the assignee hereof and are hereby expressly incorporated in their entirety by reference herein.

BACKGROUND

1. Field

Aspects of the present disclosure relate generally to wireless communication systems, and more particularly, to techniques for managing simultaneous unicast and multicast/broadcast services in such systems.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

In a wireless communication system, a UE may communicate using a dedicated unicast service that provides two-way point-to-point communication between the UE and the network. Such a unicast service may occur at various transmission rates that are either defined or negotiated at some point in time after the UE is recognized by the system. Another commonly available communication service, which supports a one-to-many arrangement, has come to be known generally as a broadcast service. One of the commonly defined and accepted broadcast communication services is known as Multimedia Broadcast/Multicast Service (MBMS). In the context of 3GPP Long Term Evolution (LTE) systems, such a service is known as Evolved Multimedia Broadcasat/Multicast Service (eMBMS or E-MBMS).

Simultaneous support for unicast and eMBMS services in a UE presents some challenges. One challenge is that whether to support the two services simultaneously is an implementation choice left to the UE designer, and not all UEs support the two services simultaneously. This means the UE has to choose between the two services when presented with an opportunity to support both. A UE that cannot support both services simultaneously may choose, for example, to prioritize an eMBMS service over a unicast service. At least two problems can arise in such a case: (1) the UE may miss important unicast traffic while it is receiving eMBMS traffic and (2) it may take time for an eNodeB (base station) to figure out that the UE has autonomously disconnected from unicast service in favor of an eMBMS service, resulting in inefficiency.

Another challenge associated with providing simultaneous unicast and eMBMS services in a UE is that, even if the UE supports the two services simultaneously, a modification of the transmission parameters of one of the services (typically the unicast service) may be required to permit the UE to support both services simultaneously. For example, a particular UE might need to receive unicast traffic at a lower data rate to permit an eMBMS service to continue without disruption. Some current designs attempt to solve this problem by allowing the UE to update its capabilities with the network through the sending of an unsolicited UE capability information message on an as-needed basis. Though this helps the UE to support simultaneous unicast and eMBMS services, it complicates standard-compliance certification testing because of the additional uncertainty it introduces.

SUMMARY

Illustrative embodiments of the present invention that are shown in the drawings are summarized below. These and other embodiments are more fully described in the detailed description section. It is to be understood, however, that there is no intention to limit the invention to the forms described in this Summary of the Invention or in the detailed description.

Techniques for managing simultaneous unicast and multicast/broadcast services in a wireless communication system are described herein. One aspect of the present disclosure is a method for operating a user equipment (UE) in a wireless communication system, comprising transmitting, upon initial connection with the wireless communication system, a first message indicating one or more capabilities of the UE; transmitting a second message indicating that the UE is either beginning or ending simultaneous support of unicast and multicast/broadcast services; and receiving, as a result of the second message, data scheduled in accordance with one or more predetermined rules.

Another aspect of the present disclosure is a method for operating a wireless communication system, comprising receiving, from a UE, a first message indicating one or more capabilities of the UE upon initial connection of the UE with the wireless communication system; receiving a second message from the UE indicating that the UE is either beginning or ending simultaneous support of unicast and multicast/broadcast services; and scheduling data for the UE in accordance with one or more predetermined rules in response to the second message.

Another aspect of the present disclosure is a method for operating a wireless communication system, comprising determining priority information associated with a unicast service and a multicast/broadcast service; and transmitting the priority information to a user equipment (UE) to assist the UE in choosing which one of the unicast service and the multicast/broadcast service to support.

Another aspect of the present disclosure is a method for operating a UE in a wireless communication system, comprising receiving priority information associated with a unicast service and a multicast/broadcast service; and determining which one of the unicast service and the multicast/broadcast service to support based, at least in part, on the received priority information.

Another aspect of the present disclosure is a method for operating a UE in a wireless communication system, comprising receiving a unicast service; disconnecting autonomously from the unicast service in order to support a multicast/broadcast service; and transmitting a notification that the UE has decided to disconnect autonomously from the unicast service.

Yet another aspect of the present disclosure is a method for operating a wireless communication system, comprising transmitting a unicast service to a user equipment (UE) and receiving a notification from the UE that the UE has decided to disconnect autonomously from the unicast service.

These and other embodiments are described in further detail herein, including apparatuses and computer-readable storage media that carry out the methods of the invention.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
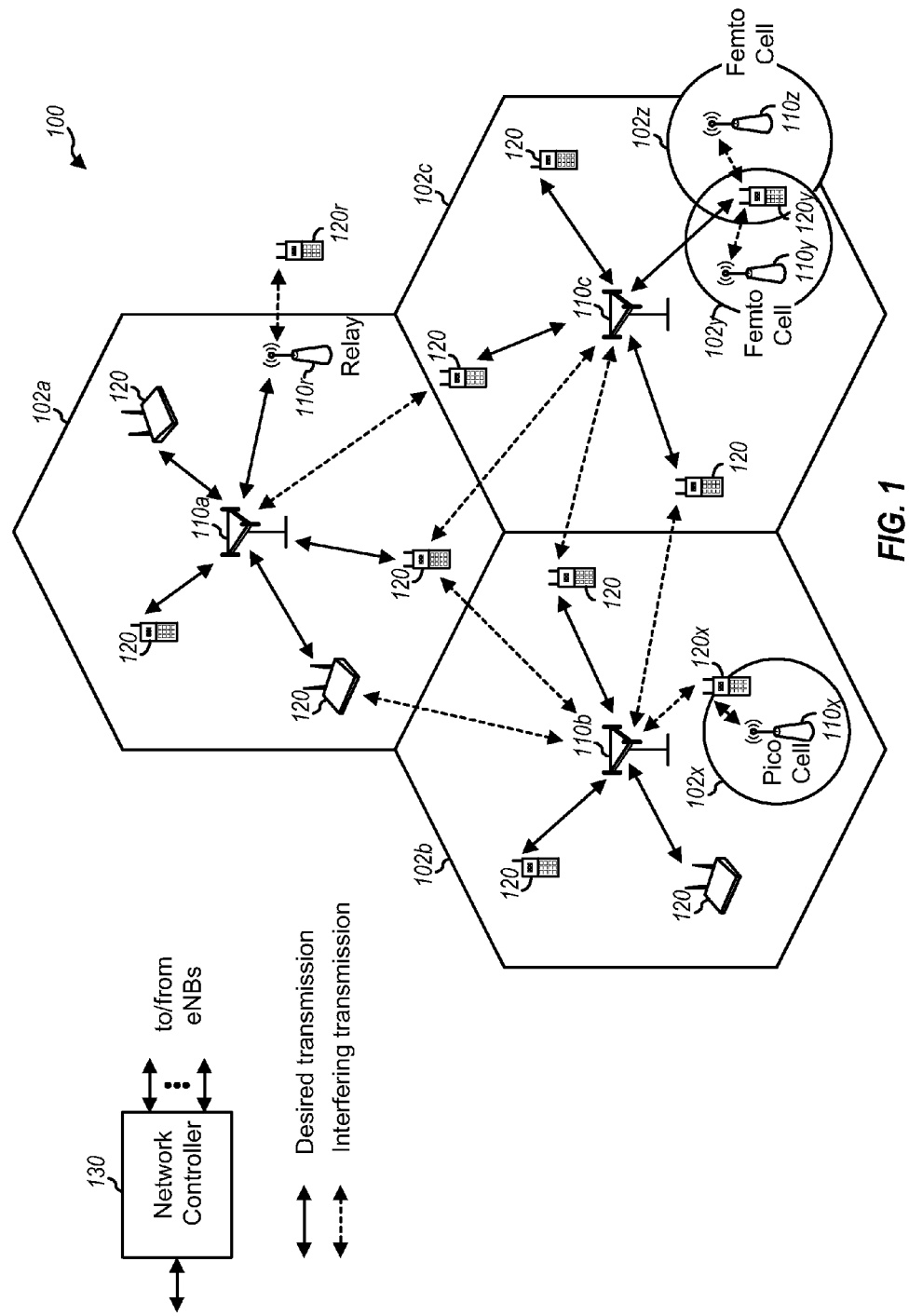
FIG. 1 is a block diagram conceptually illustrating an example of a telecommunications system in which various illustrative embodiments of the invention can be implemented.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As used herein, the term exemplary refers to an embodiment that serves an example or illustration of a given concept, and does not necessarily refer to a best mode or a preferred mode.

In one aspect of the present disclosure, a user equipment (UE) can inform the network when it either begins supporting or stops supporting simultaneous unicast and multicast/broadcast services. This information permits the network to schedule data for the UE in accordance with one or more predetermined rules. In another aspect of the present disclosure, a UE that is not capable of simultaneously supporting unicast and multicast/broadcast services receives from the network priority information that assists the UE in choosing whether to support a unicast service or a multicast/broadcast service.

In another aspect of the present disclosure, a UE that has autonomously disconnected from a unicast service in order to support a multicast/broadcast service notifies the network of the autonomous disconnection. Other aspects of the present disclosure are discussed below.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1 shows a wireless communication network 100, which may be an LTE network. The wireless network 100 may include a number of evolved Node Bs (eNodeBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs 120x with service subscription. A femto cell may cover a relatively small geographic area (e.g., a home) and may allow restricted access by UEs 120y having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
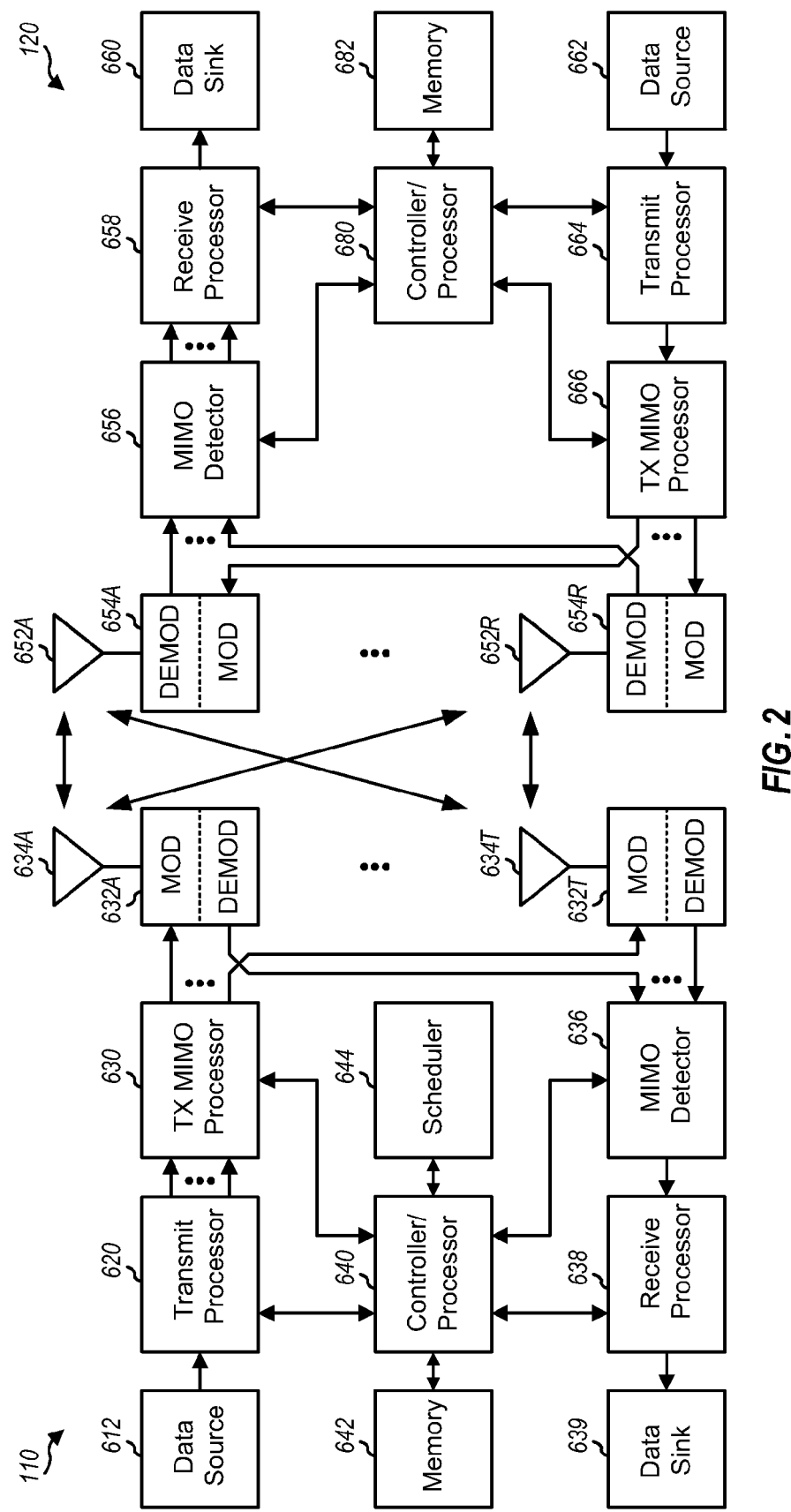
FIG. 2 is a block diagram conceptually illustrating a design of a base station/eNodeB and a UE configured in accordance with one aspect of the present disclosure.

FIG. 2 shows a block diagram of a design of a base station/eNodeB 110 and a UE 120, which may be one of the base stations/eNodeBs and one of the UEs in FIG. 1. For a restricted association scenario, the base station 110 may be the macro eNodeB 110c in FIG. 1, and the UE 120 may be the UE 120y. The base station 110 may also be a base station of some other type. The base station 110 may be equipped with antennas 634A through 634T, and the UE 120 may be equipped with antennas 652A through 652R.

At the base station 110, a transmit processor 620 may receive data from a data source 612 and control information from a controller/processor 640. The control information may be for the PBCH, PCFICH, PHICH, PDCCH, etc. The data may be for the PDSCH, etc. The processor 620 may process (e.g., encode and symbol map) the data and control information to obtain data symbols and control symbols, respectively. The processor 620 may also generate reference symbols, e.g., for the PSS, SSS, and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632A through 632T. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632A through 632T may be transmitted via the antennas 634A through 634T, respectively.

At the UE 120, the antennas 652A through 652R may receive the downlink signals from the base station 110 and may provide received signals to the demodulators (DEMODs) 654A through 654R, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654A through 654R, perform MIMO detection on the received symbols if applicable, and provide detected symbols. A receive processor 658 may process (e.g., demodulate, deinterleave, and decode) the detected symbols, provide decoded data for the UE 120 to a data sink 660, and provide decoded control information to a controller/processor 680.

On the uplink, at the UE 120, a transmit processor 664 may receive and process data (e.g., for the PUSCH) from a data source 662 and control information (e.g., for the PUCCH) from the controller/processor 680. The processor 664 may also generate reference symbols for a reference signal. The symbols from the transmit processor 664 may be precoded by a TX MIMO processor 666 if applicable, further processed by the modulators 654A through 654R (e.g., for SC-FDM, etc.), and transmitted to the base station 110. At the base station 110, the uplink signals from the UE 120 may be received by the antennas 634, processed by the demodulators 632, detected by a MIMO detector 636 if applicable, and further processed by a receive processor 638 to obtain decoded data and control information sent by the UE 120. The processor 638 may provide the decoded data to a data sink 639 and the decoded control information to the controller/processor 640.

The controllers/processors 640 and 680 may direct the operation at the base station 110 and the UE 120, respectively. The processor 640 and/or other processors and modules at the base station 110 may perform or direct the execution of various processes for the techniques described herein. The processor 680 and/or other processors and modules at the UE 120 may also perform or direct the execution of the functional blocks illustrated in FIGS. 4 and 5, and/or other processes for the techniques described herein. The memories 642 and 682 may store data and program codes for the base station 110 and the UE 120, respectively. A scheduler 644 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 680, the memory 682, the receive processor 658, the MIMO detector 656, the demodulators 654, and the antennas 652 configured to perform the functions recited by the aforementioned means. In another aspect, the aforementioned means may be a module or any apparatus configured to perform the functions recited by the aforementioned means.

The system may support a frequency division duplex (FDD) mode and/or a time division duplex (TDD) mode. In the FDD mode, separate frequency channels may be used for the downlink and uplink, and downlink transmissions and uplink transmissions may be sent concurrently on their separate frequency channels. In the TDD mode, a common frequency channel may be used for both the downlink and uplink, downlink transmissions may be sent in some time periods, and uplink transmissions may be sent in other time periods.

A Multicast/Broadcast Single Frequency Network (MBSFN) is a broadcast network where several transmitters simultaneously send the same signal over the same frequency channel. Analog FM and AM radio broadcast networks as well as digital broadcast networks can operate in this manner. Analog television transmission has proven to be more difficult, since the MBSFN results in ghosting due to echoes of the same signal.

A simplified form of MBSFN can be achieved by a low-power co-channel repeater, booster, or broadcast translator, which is utilized as gap filler transmitter. The aim of MBSFNs is efficient utilization of the radio spectrum, allowing a higher number of radio and TV programs in comparison to traditional multi-frequency network (MFN) transmission. A MBSFN may also increase the coverage area and decrease the outage probability in comparison to an MFN, since the total received signal strength may increase to positions midway between the transmitters. A MBSFN can be used, for example, to support Multimedia Broadcast/Multicast Service (MBMS) in 3GPP LTE.

MBSFN schemes are somewhat analogous to what in non-broadcast wireless communication, for example cellular networks and wireless computer networks, is called transmitter macrodiversity, CDMA soft handoff and Dynamic Single Frequency Networks (DSFN). MBSFN transmission can be considered as a special form of multipath propagation. In multipath propagation generally, the radio receiver receives several echoes of the same signal, and the constructive or destructive interference among these echoes (also known as self-interference) may result in fading. This is problematic especially in wideband communication and high-data rate digital communications, since the fading in that case is frequency-selective (as opposed to flat fading), and since the time spreading of the echoes may result in intersymbol interference (ISI). Fading and ISI can be avoided by means of diversity schemes and equalization filters. In an MBSFN transmission, means are provided for the receiver to align these echoes of the signal so that they function only as constructive interference, resulting in a higher signal-to-noise ratio (SNR).

In wideband digital broadcasting, self-interference cancellation is facilitated by the Orthogonal Frequency-Division Multiplexing (OFDM) or Coded Orthogonal Frequency-Division Multiplexing (COFDM) modulation method. OFDM uses a large number of slow low-bandwidth modulators instead of one fast wide-band modulator. Each modulator has its own frequency sub-channel and sub-carrier frequency. Since each modulator is very slow, one can afford to insert a guard interval between the symbols, and thus reduce the ISI.

Although the fading is frequency-selective over the whole frequency channel, it can be considered as flat within the narrowband sub-channel. Thus, advanced equalization filters can be avoided. A forward error correction code (FEC) can help to counteract the effects of fading.

OFDM is utilized in the terrestrial digital TV broadcasting systems such as DVB-T and ISDB-T. OFDM is also widely used in digital radio systems, including DAB, HD Radio, and T-DMB. Therefore these systems are well suited to MBSFN operation. The 8VSB modulation method used in North America for digital TV, specified in ATSC standard A/110, may perhaps also allow the use of MBSFN transmission.

Through the use of virtual channel numbering, a multi-frequency network (MFN) can appear as an MBSFN to the viewer in ATSC. Alternatives to using OFDM modulation in MBSFN self-interference cancellation would be: CDMA Rake receivers, MIMO channels (i.e. phased array antenna), single-carrier modulation in combination by guard intervals and frequency domain equalization. In a Multicast/Broadcast Single Frequency Network, the transmitters and receivers are usually synchronized with the others, using GPS or a signal from the main station or network as a reference clock. For example, the use of a special marker can be employed, the Mega-frame Initialization Packet (MIP) that is inserted in the bit stream at a central distribution point, and signals to the MBSFN transmitters the absolute time (as read from a GPS receiver) at which this point in the data stream is to be broadcast.

Figure 3A:
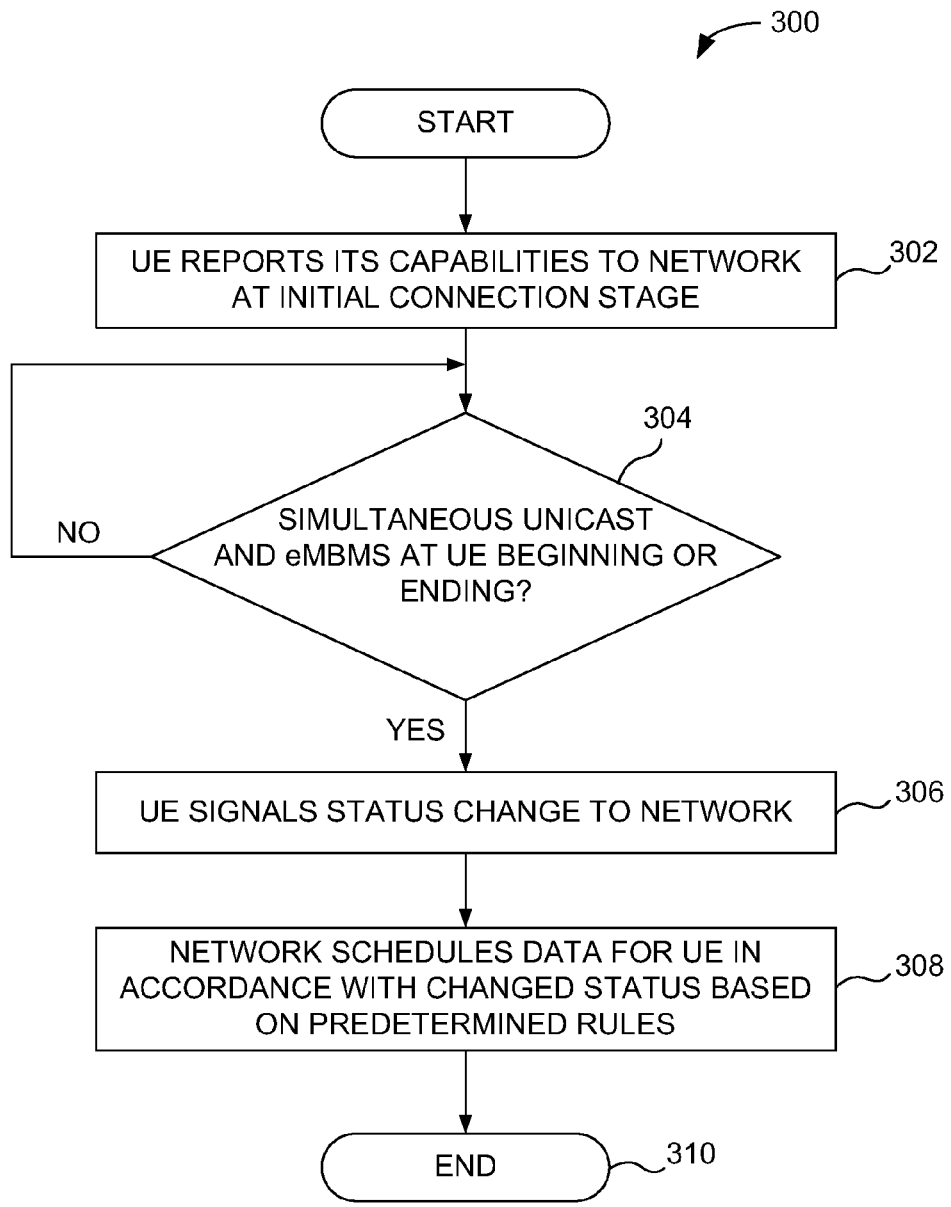
FIG. 3A is a flowchart of a method for managing simultaneous unicast and multicast/broadcast services in a wireless communication system in accordance with one aspect of the present disclosure.
Figure 3B:
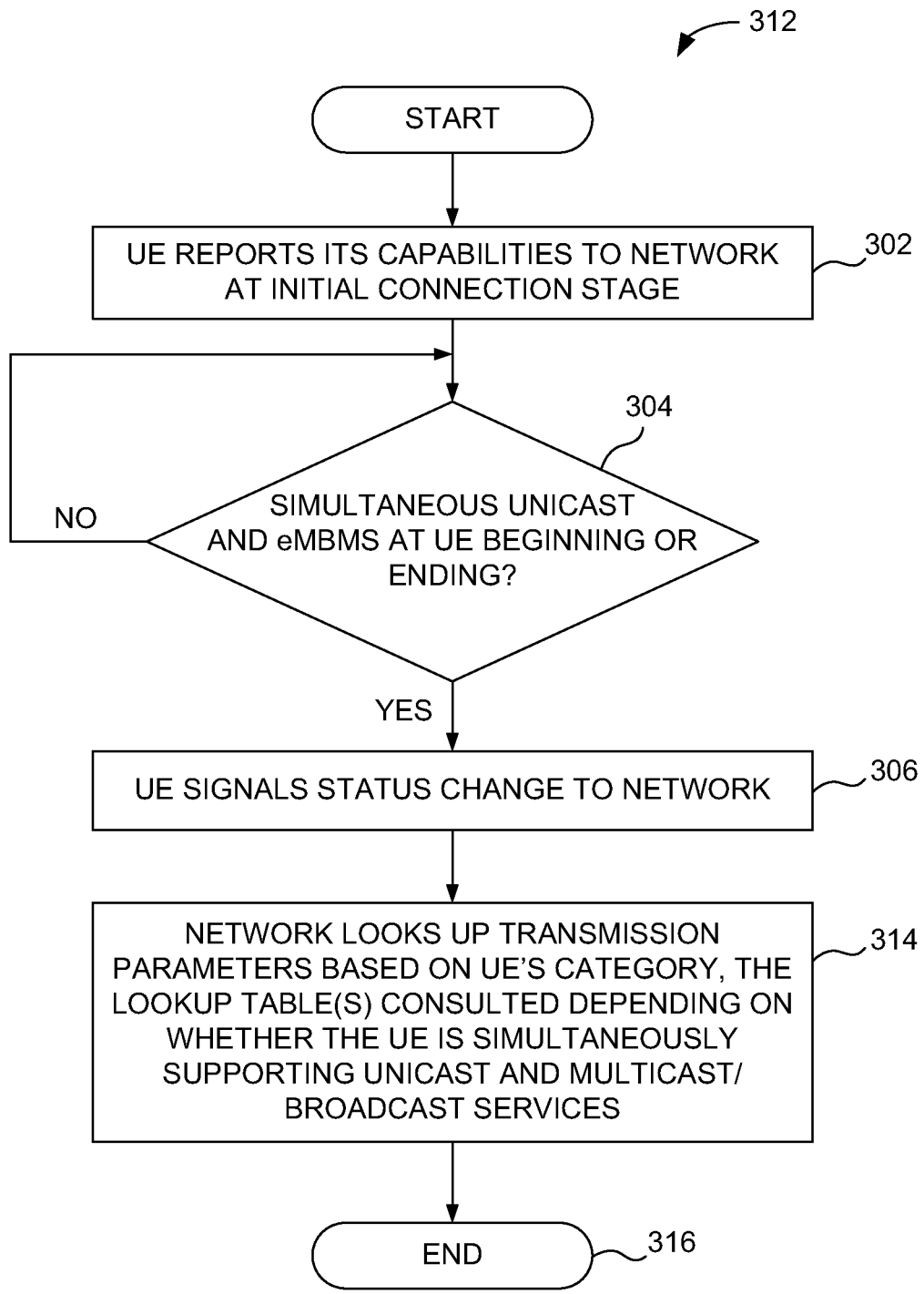
FIG. 3B is a flowchart of a method for managing simultaneous unicast and multicast/broadcast services in a wireless communication system in accordance with another aspect of the present disclosure.
Figure 3C:
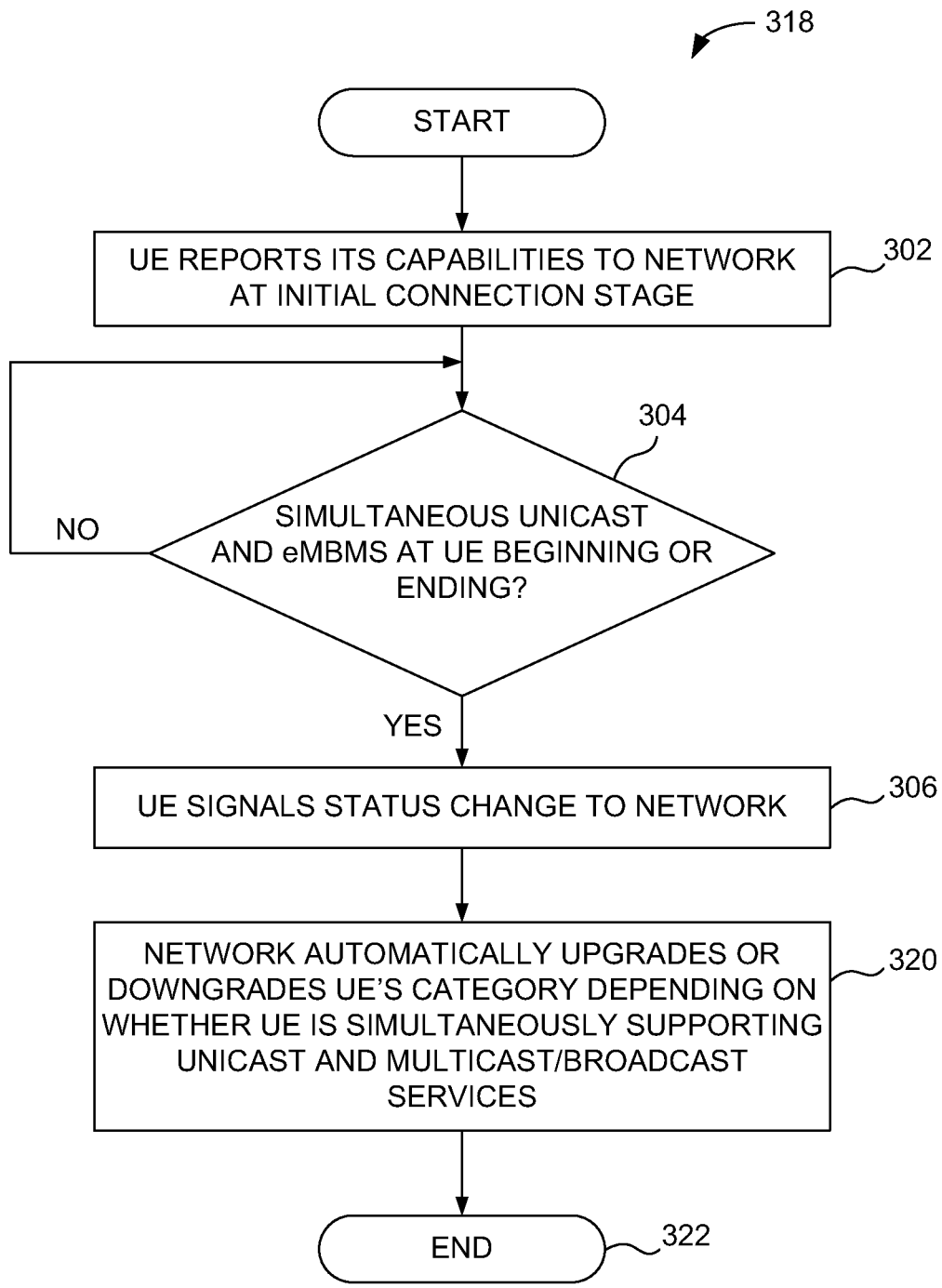
FIG. 3C is a flowchart of a method for managing simultaneous unicast and multicast/broadcast services in a wireless communication system in accordance with yet another aspect of the present disclosure.

FIG. 3A is a flowchart of a method 300 for managing simultaneous unicast and multicast/broadcast services in a wireless communication system in accordance with one aspect of the present disclosure. It is noted that blocks 302, 304, and 306 in FIGS. 3A-C are performed by the UE, whereas the remaining blocks of FIGS. 3A-C are performed by a network entity. With reference once again to FIG. 3A, at 302, a UE 120 (see FIG. 1) reports its capabilities to the network (e.g., to an eNodeB 110) upon its initial connection or reconnection with the network. Various factors determine the capabilities of a given UE 120, such as the processing capability of the UE 120, its storage or buffering capability, its enabled functionality, and its location. In standards such as LTE, UEs 120 may be assigned to numerical "categories" in accordance with their capabilities.

The method next proceeds to 304, where it remains until either (1) the UE 120 determines that it is about to begin simultaneously supporting unicast and multicast/broadcast (e.g., eMBMS) services or (2) the UE 120 determines that it is about to cease simultaneously supporting unicast and eMBMS services. For example, the condition at 304 would be satisfied where the UE 120 is supporting unicast service (e.g., a phone call) and the user decides to access an eMBMS service (e.g., a streaming movie) at the same time, or vice versa. The condition at 304 would also be satisfied where the UE 120 is simultaneously supporting unicast and eMBMS reception and either or both services are then terminated, whether by the user's deliberate action or due to other factors (e.g., a movie reaching its end). Whether a UE 120 is simultaneously supporting unicast and eMBMS services is sometimes referred to herein as the UE's 120 "simultaneous-services-support status." The condition at 304 concerns whether that status has changed or is about to change. The UE 120 may inform the network of changes in that status as they occur.

If the condition at 304 is satisfied, the UE 120, at 306, signals to an eNodeB 110 that it has either started or stopped simultaneously supporting unicast and eMBMS services. At 308, the network may automatically schedule traffic for UE 120 in accordance with the updated status (e.g., unicast+ eMBMS, unicast only, or eMBMS only) based on one or more predetermined rules. Examples of such rules are discussed in greater detail below in connection with various aspects of the present disclosure. At 310, the method terminates.

There are a variety of ways in which a UE 120 can inform the network that its simultaneous-services-support status has changed. In one illustrative embodiment, the UE signals a change to the network via a simple flag. For example, a binary flag could be used, one state of the binary flag indicating that the UE 120 is beginning simultaneous support of unicast and eMBMS services, the other state indicating that the UE 120 is ending simultaneous support of unicast and eMBMS services. In another embodiment, a binary flag can indicate the on/off or true/false status of eMBMS support by UE 120. In a different embodiment, the UE 120 can append information regarding its simultaneous-services-support status to a measurement report that it transmits to the network. Such an approach has the advantage that more information than just two states (as with a binary flag) can be conveyed. For example, a UE 120 could signal the network that it expects to support a multicast/broadcast service (e.g., a movie) at a predetermined time in the future. In some embodiments, the network may also infer when a eMBMS service has terminated (e.g., based on the known length of a movie), resulting in a change of simultaneous-services-support status in a UE 120.

FIG. 3B is a flowchart of a method 312 for managing simultaneous unicast and multicast/broadcast services in a wireless communication system in accordance with another aspect of the present disclosure. The method shown in FIG. 3B is similar to that discussed above in connection with FIG. 3A and proceeds in a similar fashion through Block 306. At 314, the eNodeB 110, in response to the UE's 120 status-change message at 306, looks up the applicable transmission parameters (e.g., transport block sizes) in one or more pre-defined lookup tables. Which lookup table(s) the eNodeB 110 consults depends on whether the UE 120 is simultaneously supporting unicast and eMBMS services or not. That is, the eNodeB 110 may consult one lookup table or set of lookup tables when the UE 120 is supporting only one service (unicast or eMBMS), and the eNodeB 110 may consult a different lookup table or set of lookup tables when the UE is simultaneously supporting unicast and eMBMS services. In one embodiment, the UE's 120 category can remain unchanged regardless of whether or not the UE 120 is supporting the two services simultaneously. What changes instead is the category-based lookup table(s) the network consults in selecting transmission parameters, depending on the UE's 120 simultaneous-services-support status.

An example from LTE will serve to illustrate. Table 1 is an illustrative table listing examples of downlink physical-layer parameter values that are set based on the UE's 120 category, such as might be used in an LTE system. Table 1 is applicable when the UE 120 is supporting a unicast service only.

TABLE 1

Downlink Parameters Table (Unicast Only)

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |

TABLE 1-continued

Downlink Parameters Table (Unicast Only)

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
|---|---|---|---|---|
| Category 4 | 150752 | 75376 | 1827072 | 2 |
| Category 5 | 299552 | 149776 | 3667200 | 4 |
| Category 6 | 301504 | 149776 (4 layers) 75376 (2 layers) | 3667200 | 2 or 4 |
| Category 7 | 301504 | 149776 (4 layers) 75376 (2 layers) | 3667200 | 2 or 4 |
| Category 8 | 2998560 | 299856 | 35982720 | 8 |

Table 2 is an illustrative table listing examples of the maximum number of bits of a Multicast Channel (MCH) transport block received by a UE 120 within a Transmission Time Interval (TTI) set in accordance with the UE's 120 category, such as might be found in an LTE system. Table 2 is applicable to eMBMS-capable UEs 120.

TABLE 2

Maximum Size of MCH Transport Block Received Within a TTI

| UE Category | Maximum number of bits of a MCH transport block received within a TTI |
|---|---|
| Category 1 | 10296 |
| Category 2 | 51024 |
| Category 3 | 75376 |
| Category 4 | 75376 |
| Category 5 | 75376 |
| Category 6 | 75376 |
| Category 7 | 75376 |
| Category 8 | 75376 |

Table 3 is an illustrative alternative table analogous to Table 1 that the eNodeB may consult when a UE 120 is simultaneously supporting unicast and eMBMS services, in accordance with one aspect of the present disclosure.

TABLE 3

Alternative Downlink Parameters Table (Unicast + eMBMS)

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
|---|---|---|---|---|
| Category 1 | 5148 | 5148 | 250368 | 1 |
| Category 2 | 25512 | 25512 | 1237248 | 2 |
| Category 3 | 51024 | 37688 | 1237248 | 2 |
| Category 4 | 75376 | 37688 | 1827072 | 2 |
| Category 5 | 149776 | 74888 | 3667200 | 4 |
| Category 6 | 150752 | 74888 (4 layers) 37688 (2 layers) | 3667200 | 2 or 4 |
| Category 7 | 150752 | 74888 (4 layers) 37688 (2 layers) | 3667200 | 2 or 4 |
| Category 8 | 1499280 | 149928 | 35982720 | 8 |

In Table 3, the transport block sizes in the second and third columns from the left have been uniformly halved relative to their counterparts in Table 1, but this is merely one example.

In other embodiments, the transport block sizes may be reduced in an entirely different manner. When the eNodeB 110 puts into effect the values of the transmission parameters specified in Table 3, the UE 120 receives unicast traffic at a lower data rate to accommodate simultaneous support for an eMBMS service. It is desirable, though not mandatory, that the data rate of the eMBMS service be maintained at its original level and that the unicast service be adjusted downward in data rate, if necessary, to accommodate simultaneous support of the two services in the UE 120. Of course, not all UEs may require such downward adjustment of the unicast data rate. Some high-end UEs might not need such accommodation to support unicast and eMBMS services simultaneously. Such differences among UEs can easily be accounted for based on their respective categories in lookup tables such as Tables 1-3. At 316, the method in FIG. 3B terminates.

FIG. 3C is a flowchart of a method 318 for managing simultaneous unicast and multicast/broadcast services in a wireless communication system in accordance with yet another aspect of the present disclosure. The method shown in FIG. 3C is similar to that discussed above in connection with FIG. 3A and proceeds in a similar fashion through Block 306. In this particular embodiment, the wireless communication system, unlike the embodiment discussed above in connection with FIG. 3B, can use the same UE-category-based transmission-parameter lookup table or set of lookup tables whether the UE 120 is simultaneously supporting unicast and eMBMS services or not. That is, the network does not consult a different lookup table or set of lookup tables depending on the UE's 120 simultaneous-services-support status. Instead, the network automatically modifies or adjusts the UE's category based on one or more predetermined rules as the UE's 120 simultaneous-services-support status changes.

At 320, the eNodeB 110 automatically downgrades the UE's category in accordance with predetermined rules if the UE is commencing support of simultaneous unicast and eMBMS services. Likewise, the eNodeB 110 automatically upgrades or restores the UE's category in accordance with predetermined rules if the UE ceases support of simultaneous unicast and eMBMS services. A UE 120 category downgrade could apply only to unicast services or to both unicast and multicast/broadcast services, depending on the particular implementation. It is desirable, but not mandatory, that the UE's 120 category for eMBMS services remain constant and that the UE's category for unicast services be adjusted downward to accommodate simultaneous support of the two services, where such adjustment is needed to remain within the capabilities of the UE 120. Once simultaneous support of unicast and eMBMS services has ceased due to termination of either or both services, the eNodeB 110 can adjust upward (upgrade) the UE's category (e.g., to its nominal value for unicast service only).

The particular rules the network follows in automatically downgrading a UE's category can vary, depending on the particular implementation. In one illustrative embodiment, the UE's 120 category is automatically downgraded by one level. For example, a UE 120 with a nominal category of "3" is downgraded to category "2". In another embodiment, the UE 120 might be downgraded by two levels or some other number of levels. In general, such a rule can be formulated as a downgrade in UE 120 category by N, where N is a natural number greater than or equal to 0 within a permissible range that is consistent with the applicable UE 120 and wireless communication standard. At 322, the method in FIG. 3C terminates.

The UE's 120 signaling the network (see Block 306 in FIGS. 3A-3C) whenever its simultaneous-services-support status changes can have certain advantages or benefits. For example, notification of status changes by the UE 120 may permit the eNodeB 110 to accommodate the UE's support of simultaneous unicast and eMBMS services automatically based on predetermined rules. Examples of such rules have been discussed above in connection with FIGS. 3B and 3C, but many other rules configurations are possible. Such an approach may simplify standard-compliance certification testing of UEs 120.

In some situations, the network polls a UE 120 regarding its interest in a particular eMBMS service. The UE's response to such a request is sometimes referred to as a "counting response" (the network "counts" the responses of UEs 120 to the inquiry). Though such a counting response is not as timely or effective of a means for a UE 120 to notify the network of a change in its simultaneous-services-support status as the UE-initiated reporting approaches discussed above, some use can still be made of such counting responses. One difficulty is that a UE 120 may move from cell to cell within the wireless communication system between successive counting requests from the network. To make a UE's 120 interest in a particular upcoming eMBMS service persistent, it may be necessary for a source cell to include the UE's interest in the eMBMS service in a handover message to the target cell.

Figure 4:
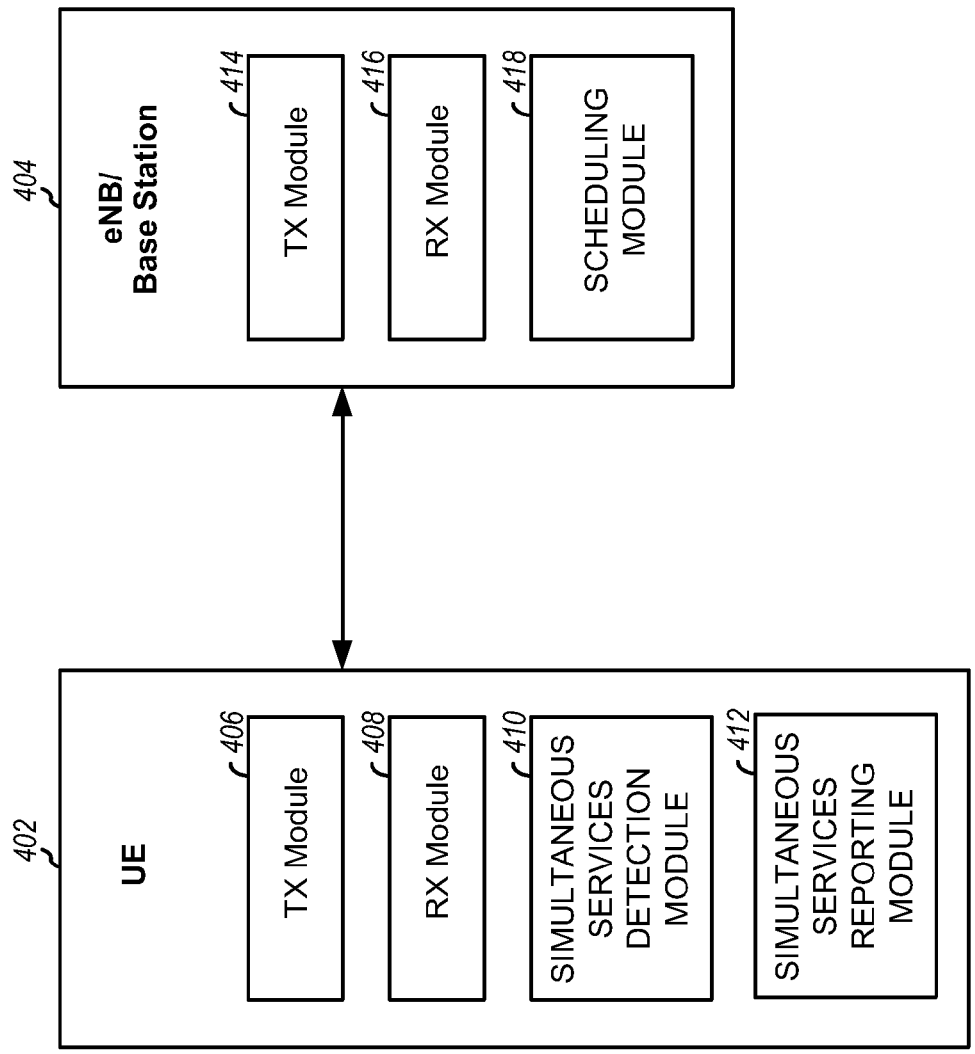
FIG. 4 is a functional block diagram of a UE and a base station/eNodeB in accordance with an aspect of the present disclosure.

FIG. 4 is a functional block diagram of a UE 402 and an eNodeB/base station 404 in accordance with an aspect of the present disclosure. UE 402 includes transmitter module 406, receiver module 408, simultaneous services detection module 410, and simultaneous services reporting module 412. Transmitter module 406 and receiver module 408 permit UE 402 to communicate in both directions with eNodeB/base station 404. Simultaneous services detection module 410 detects changes in the UE's 402 simultaneous-services-support status. That is, it detects whether the UE 402 has changed or is about to change from supporting only one service—unicast or eMBMS—to supporting both services simultaneously or vice versa. Simultaneous services reporting module 412 notifies eNodeB/base station 404 of the UE's current simultaneous-services-support status whenever simultaneous services detection module 410 detects a change in such status.

eNodeB/base station 404 includes transmitter module 414, receiver module 416, and scheduling module 418. Transmitter module 414 and receiver module 416 permit eNodeB/base station 404 to communicate with one or more UEs 402. Scheduling module 418 schedules data for UE 402 in response to the UE's reported simultaneous-services-support status based on one or more predetermined rules, as discussed above.

Figure 5:
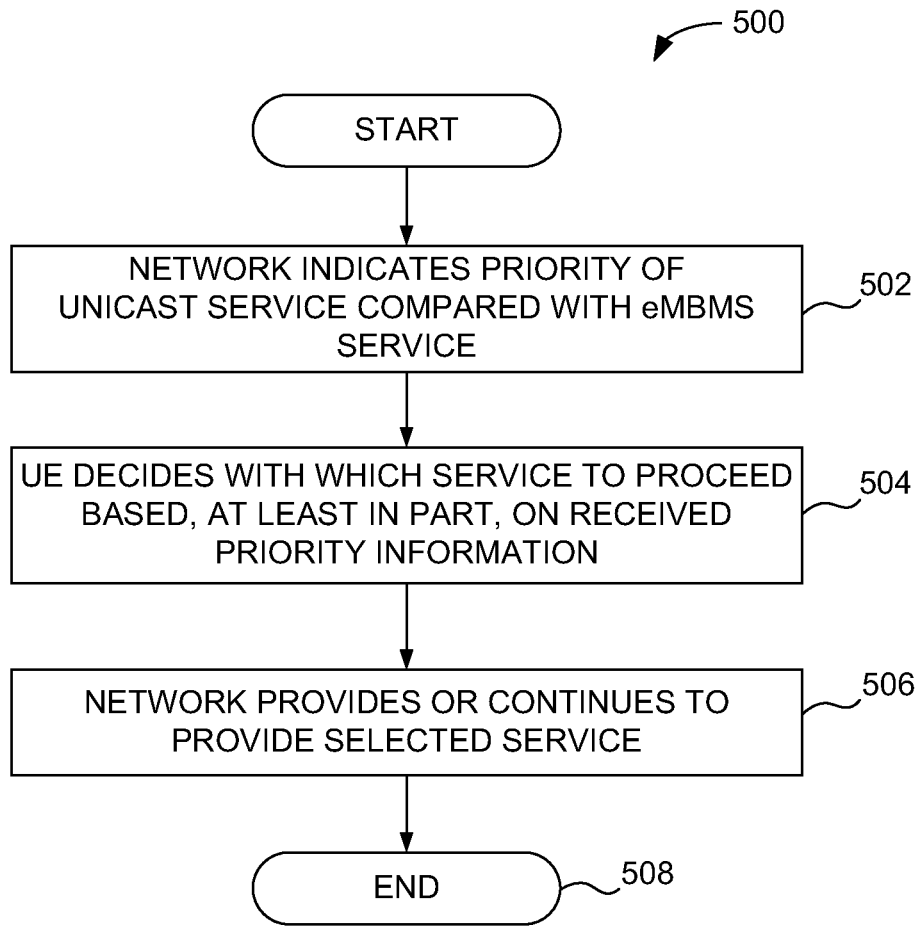
FIG. 5 is a flowchart of a method for prioritizing services in a wireless communication system in accordance with one aspect of the present disclosure.

FIG. 5 is a flowchart of a method 500 for prioritizing services in a wireless communication system in accordance with one aspect of the present disclosure. Not all UEs 120 are designed to support simultaneous unicast and eMBMS services. This leads to the difficulty that a UE 120 may be forced to choose between one service or the other when presented with an opportunity to support both. A UE that cannot support both services simultaneously may choose, for example, to prioritize an eMBMS service over a unicast service. At least two problems can arise in such a case: (1) the UE may miss important unicast traffic while it is receiving eMBMS traffic and (2) it may take time for an eNodeB (base station) to figure out that the UE has autonomously disconnected from unicast service in favor of an eMBMS service, resulting in inefficiency. The method in FIG. 5 can address these issues.

At 502, the network indicates to the UE 120 the priority of a unicast service compared with a eMBMS service. The UE 120 could be engaged in a unicast connection when a counting request (or a user-initiated request) arrives for an eMBMS service. Likewise, the UE 120 could be supporting an eMBMS service when an incoming call (unicast service) arrives. In such situations, the network informs the UE of the respective priorities of the two services based on predetermined criteria.

The network can communicate the priority information to the UE 120 in a variety of ways, depending on the particular implementation. In one embodiment, the priority information can be added to a paging message for RRC_IDLE UEs 120 (UEs that are not currently in a connected mode, e.g., engaged on a call). When such a UE receives an incoming call (unicast communication), the priority of the call compared with an already-in-progress eMBMS service can be included in the paging message so the UE 120 can decide which service to select and which to ignore or drop. For RRC_CONNECTED UEs 120 (UEs that are actively communicating with the network), the priority information can be communicated to the UE 120 via a suitable downlink message from the eNodeB 110. As such, the UE 120 can receive an indication of priority of unicast service or eMBMS service.

At 504, the UE decides with which service (unicast or eMBMS) it will proceed based, at least in part, on the priority information received from the network. At 506, the network provides or continues to provide the service with which the UE has decided to proceed. In some embodiments, the network does not receive an explicit indication from the UE 120 that the UE 120 has decided to select one service over the other. For example, in the current LTE standard, such a notification is not required. At 508, the method terminates.

Figure 6:
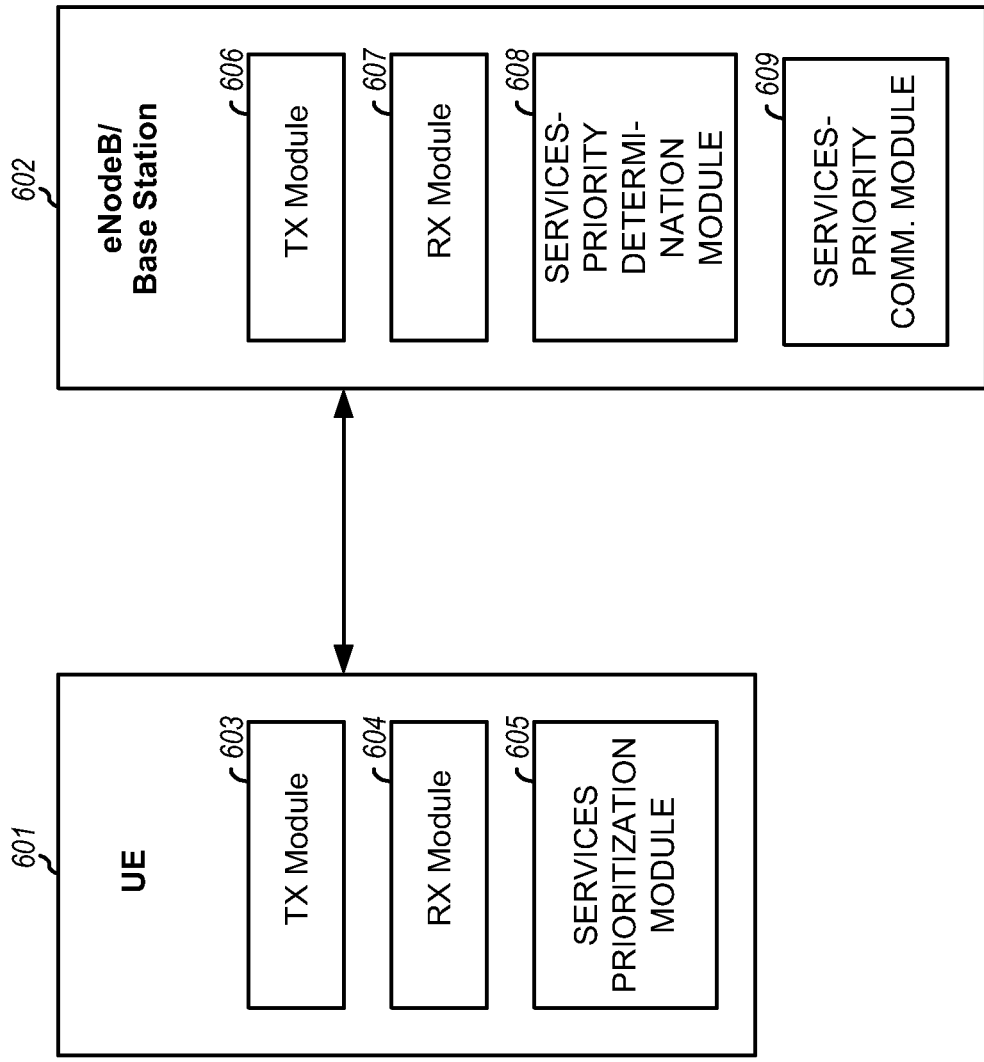
FIG. 6 is a functional block diagram of a UE and a base station/eNodeB in accordance with an aspect of the present disclosure.

FIG. 6 is a functional block diagram of a UE 601 and a base station/eNodeB 602 in accordance with an aspect of the present disclosure. UE 601 includes transmitter module 603, receiver module 604, and services prioritization module 605. Transmitter module 603 and receiver module 604 permit UE 601 to communicate with eNodeB/base station 602. Services prioritization module 605 includes logic for deciding which of the two services to favor based, at least in part, on the priority information received from the network, as discussed above. For example, services prioritization module 605 could implement a rule that a certain kind of eMBMS service always takes priority over unicast traffic (e.g., an emergency broadcast message). As a further example, services prioritization module 605 could implement a rule that an incoming phone call from a particular number (e.g., a spouse) always takes priority over an active eMBMS service. Many other rules can be devised, depending on the particular implementation.

eNodeB/base station 602 includes transmitter module 606, receiver module 607, services-priority determination module 608, and services-priority communication module 609. Transmitter module 606 and receiver module 607 permit eNodeB/base station 602 to communicate with one or more UEs 601. Services-priority determination module 608 determines the priority of unicast and eMBMS services based on predetermined guidelines. Services-priority communication module 609 configures and communicates a message indicating the applicable priority information to a UE 601.

Figure 7:
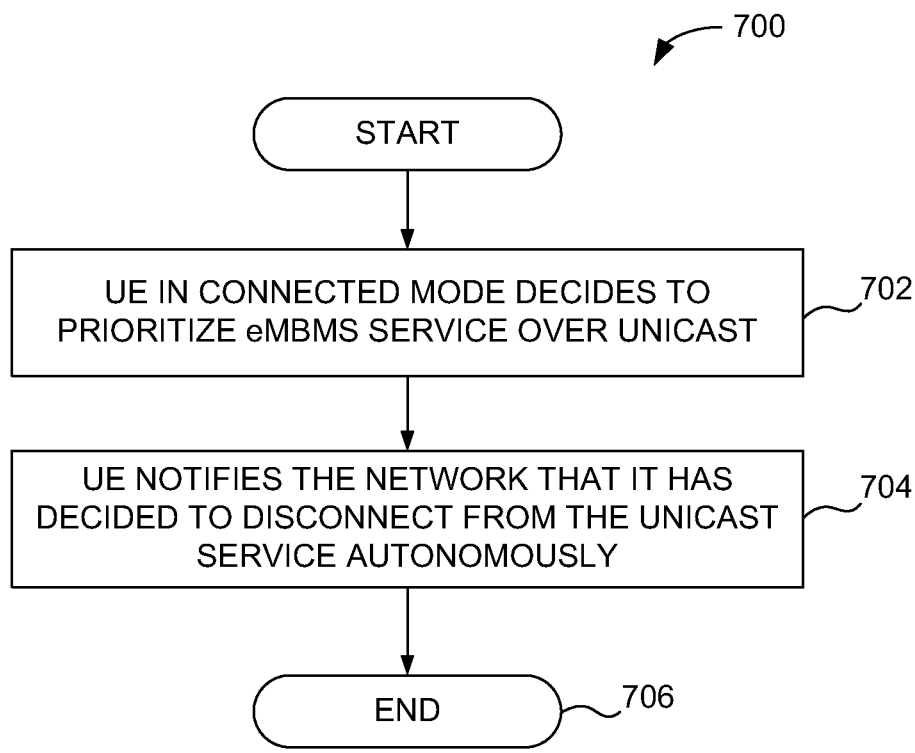
FIG. 7 is a flowchart of a method for managing disconnection from a service in a wireless communication system in accordance with one aspect of the present disclosure.

FIG. 7 is a flowchart of a method 700 for managing disconnection from a service in a wireless communication system in accordance with one aspect of the present disclosure. The method of FIG. 7 concerns another way in which the performance of a wireless communication network can be improved when a UE 120 that is incapable of simultaneously supporting unicast and eMBMS services favors an eMBMS service over a unicast service by autonomously disconnecting from the unicast service. As mentioned above, it may take time for an eNodeB 110 to determine that the UE has autonomously disconnected from unicast service in favor of an eMBMS service, which may cause inefficiency in the system.

At 702, a UE 120 in connected mode decides to prioritize an eMBMS service over a unicast service (e.g., a user waiting on hold on a phone call decides to watch a movie instead). At 704, UE 120 notifies the network that it has decided to disconnect from the unicast service autonomously. Such notification by the UE 120 allows the network to free up radio resources. The method terminates at 706.

Figure 8:
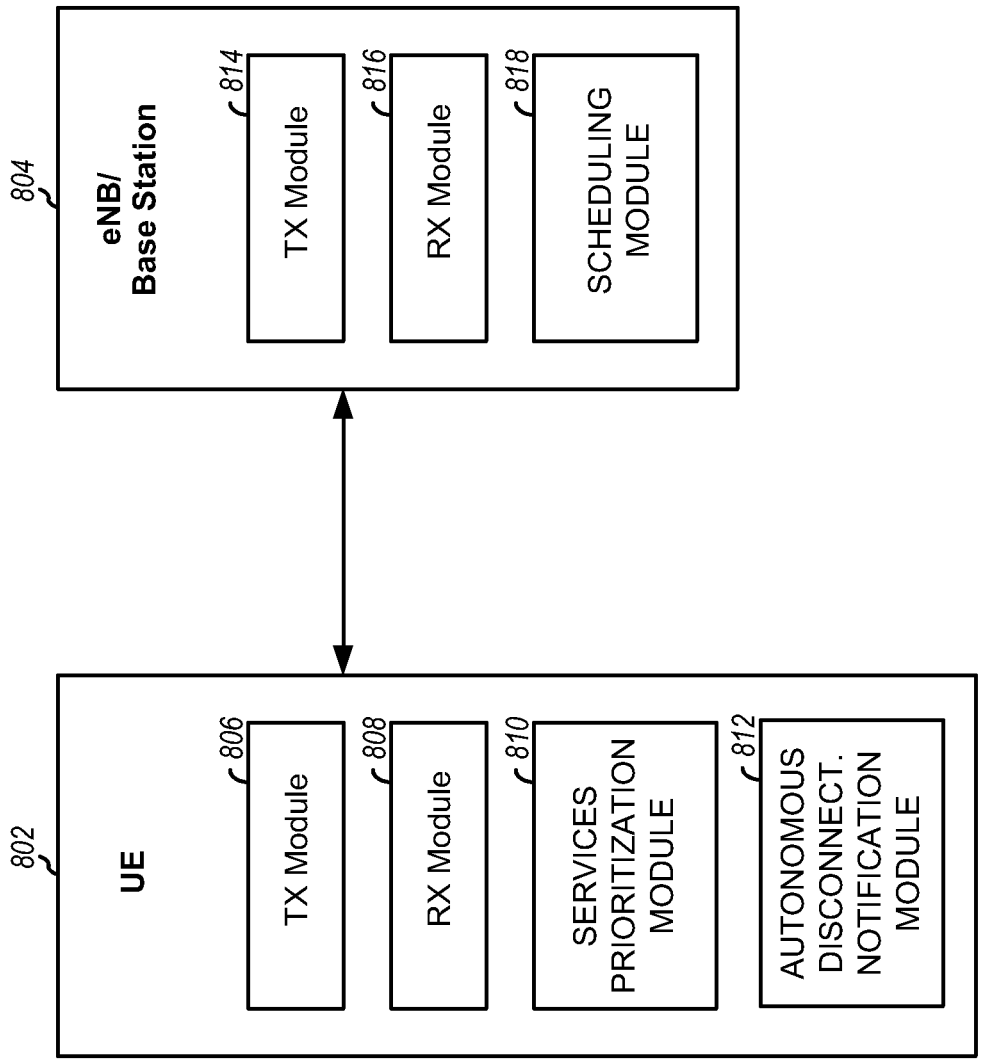
FIG. 8 is a functional block diagram of a UE and a base station/eNodeB in accordance with an aspect of the present disclosure.

FIG. 8 is a functional block diagram of a UE 802 and a eNodeB/base station 804 in accordance with an aspect of the present disclosure. UE 802 includes transmitter module 806, receiver module 808, services prioritization module 810, and autonomous disconnection notification module 812. Transmitter module 806 and receiver module 808 permit UE 802 to communicate in both directions with eNodeB/base station 804. Services prioritization module 810 determines the priority between unicast and eMBMS services based on predetermined rules or guidelines, which can be context sensitive. It may also respond to explicit priority choices based on user preferences. Autonomous disconnection notification module 812 notifies eNodeB/base station 804 when UE 802 has decided to disconnect autonomously from a unicast service in order to proceed with an eMBMS service.

eNodeB/base station 804 includes transmitter module 814, receiver module 816, and scheduling module 818. Transmitter module 814 and receiver module 816 permit eNodeB/base station 804 to communicate with one or more UEs 802. Scheduling module 818 schedules data for UE 802 in response to the UE's 802 decision to disconnect from a unicast service in order to support an eMBMS service.

In some embodiments, the techniques discussed above in connection with FIGS. 5-6 and 7-8 can be combined. In such an embodiment, the UE 120 can receive priority information from the network; choose to prioritize an eMBMS service over a unicast service based, at least in part, on the received priority information; and inform the network that it has decided to disconnect autonomously from the unicast service.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 9:
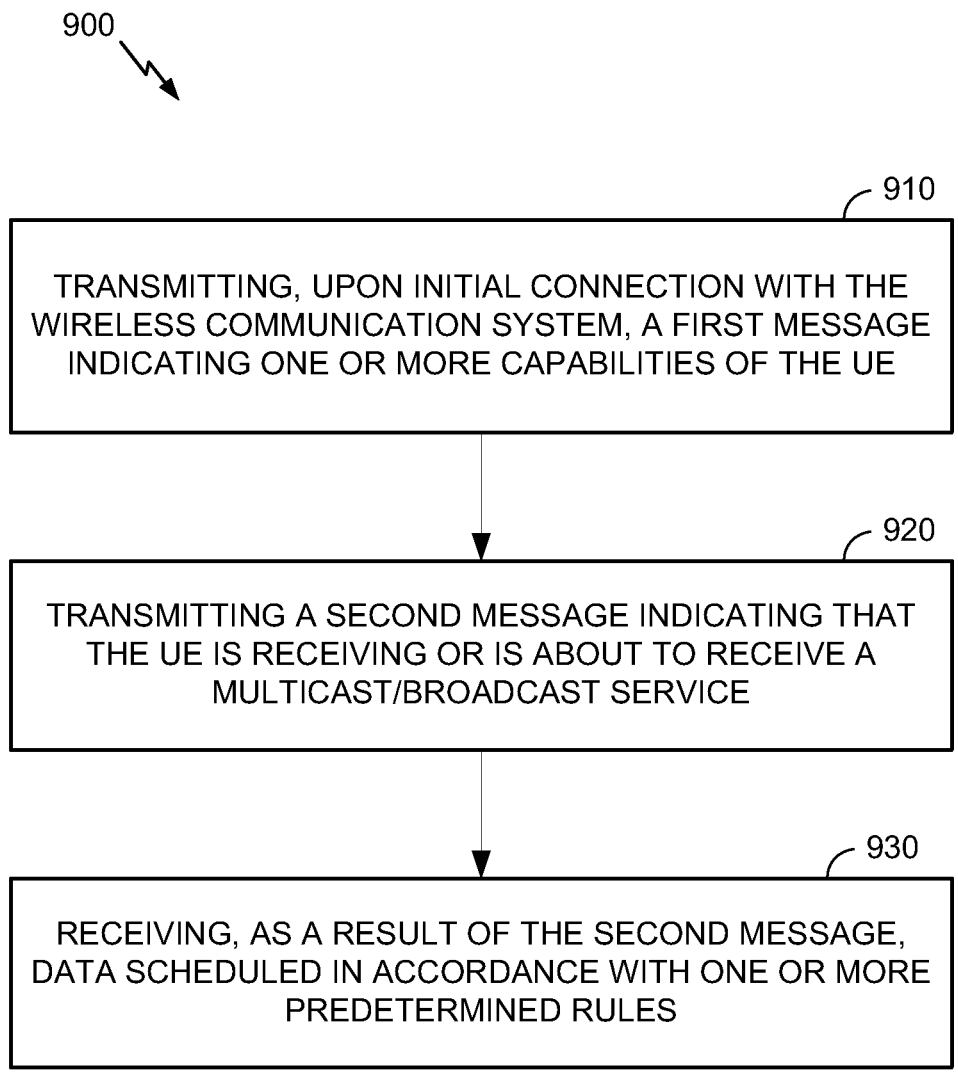
FIG. 9 illustrates an embodiment of a methodology for managing simultaneous unicast and multicast/broadcast services, operable by a mobile entity.

In accordance with one or more aspects of the embodiments described herein, there is provided an exemplary technique for simultaneous unicast and multicast/broadcast services in a wireless communication system. With reference to FIG. 9, illustrated is a methodology 900 that may be performed by a mobile entity (e.g., a UE or the like) in the wireless communication system. The method 900 may involve, at 910, transmitting, upon initial connection with the wireless communication system, a first message indicating one or more capabilities of the UE. The method 900 may involve, at 920, transmitting a second message indicating that the UE is receiving or is about to receive a multicast/broadcast service. The method 900 may involve, at 930, receiving, as a result of the second message, data scheduled in accordance with one or more predetermined rules.

In related aspects, the first message may include or be, for example, a UE-Capability-Information message for providing the UE radio access capability information requested by an Evolved UMTS Terrestrial Radio Access Network (E-UTRAN) or the like. In further aspects, the second message may be used to indicate the UE's request for or interest in a MBMS service. For example, the second message may include or be a MBMS-Interest-Indication message with which the UE signals its interest or request for the MBMS service.

The UE may use the MBMS-Interest-Indication message to signal which frequency it is interested in for the MBMS service, as well as the priority between unicast and MBMS. If the UE is interested in service(s) deployed on a given frequency, the UE may signal the given frequency in the MBMS-Interest-Indication message, such that the eNB can schedule a unicast service by taking into account the MBMS data rate on the given frequency. When the eNB performs unicast scheduling, the eNB may take into account the MBMS data rate at that particular time on the given frequency, and may adjust unicast scheduling accordingly. If the UE is no longer interested in the MBMS service, the UE may signal, for example, an empty list so that the eNB knows that it should schedule unicast service(s) without accommodating MBMS transmission(s). In the alternative, or in addition, the UE may also signal the detailed temporary mobile group identity (TMGI) (service ID) in the second message. In this approach, the eNB may take into account the unicast scheduling for a particular UE with more specificity, e.g., the eNB may look at the scheduled MTCH at the particular time when unicast data is transmitted. If the transmitted MTCH is the one which the particular UE is interested in, then the eNB may discount MTCH data rate to schedule unicast; otherwise, the eNB may schedule unicast without taking into account the MTCH data rate since the UE is not interested in that particular MTCH.

Figure 10A:
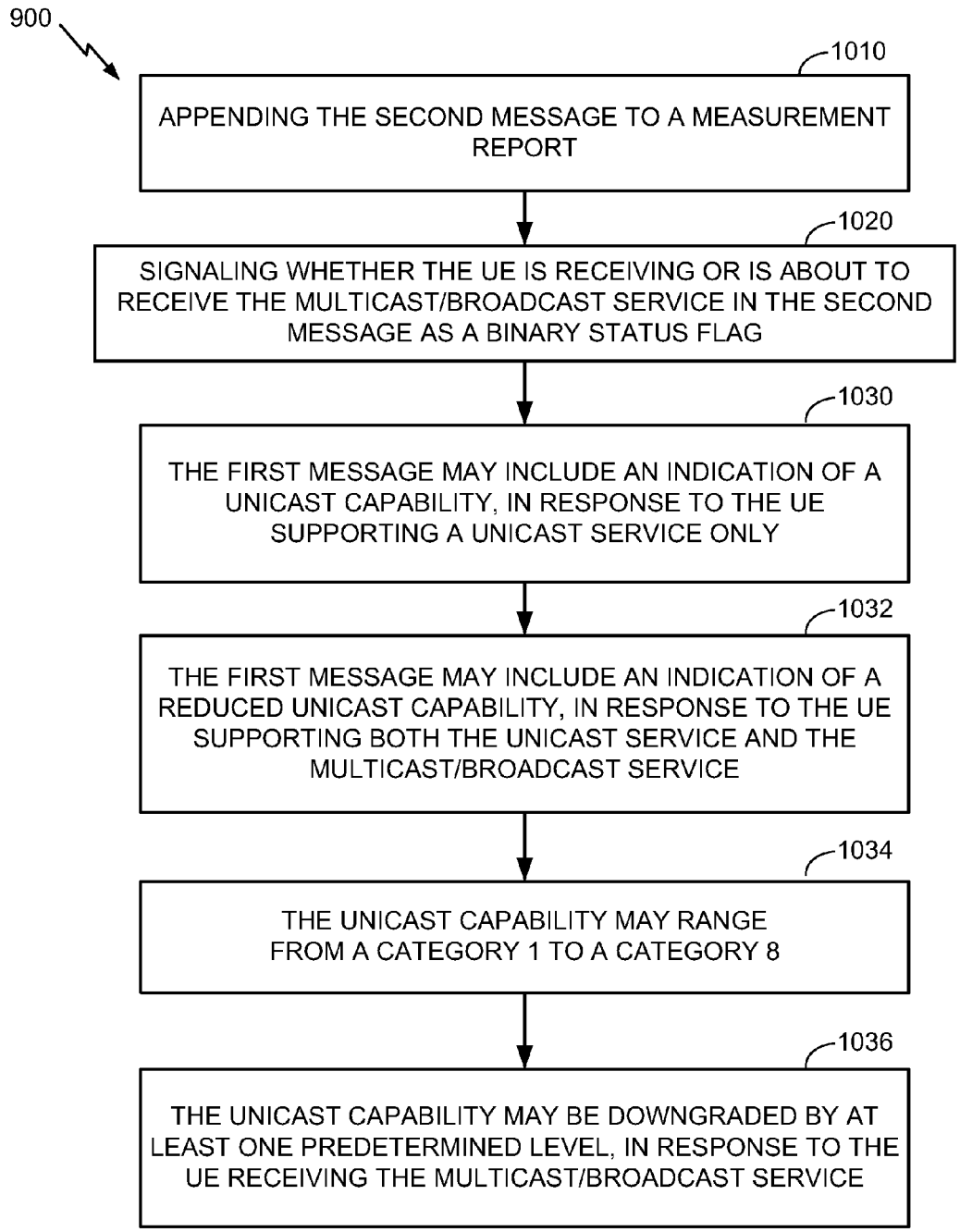
FIGS. 10A-B show further aspects of the methodology of FIG. 9.
Figure 10B:
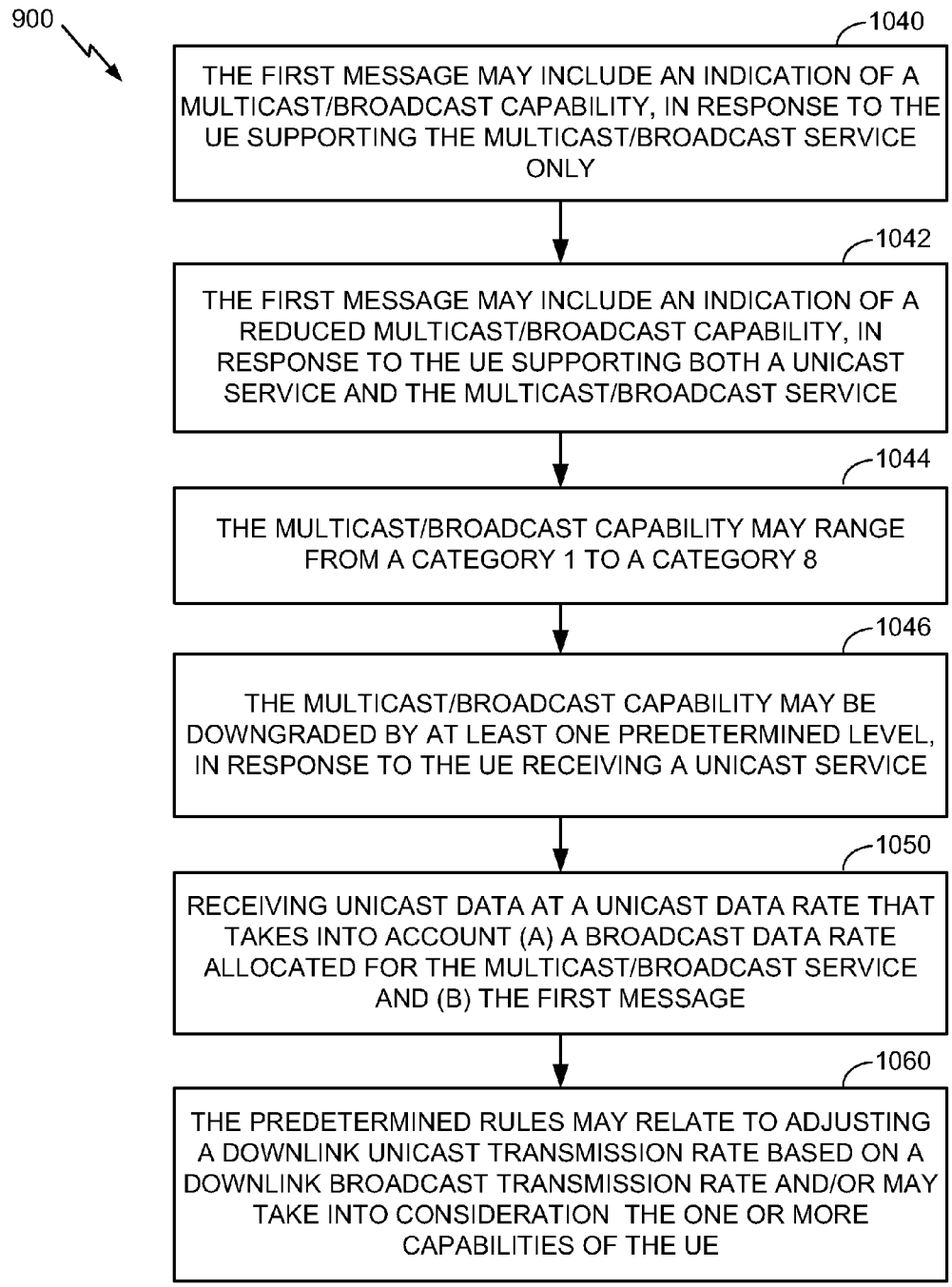

With reference to FIGS. 10A-B, there are shown further operations or aspects of the method 900 that are optional and may be performed by the mobile entity for managing simultaneous unicast and multicast/broadcast services. It is noted that the blocks shown in FIGS. 10A-B are not required to perform the method 900. If the method 900 includes at least one block of FIGS. 10A-B, then the method 900 may terminate after the at least one block, without necessarily having to include any subsequent downstream block(s) that may be illustrated. It is further noted that numbers of the blocks do not imply a particular order in which the blocks may be performed according to the method 900. For example, with reference to FIG. 10A, The method 900 may involve appending the second message to a measurement report (block 1010). The method 900 may involve signaling whether the UE is receiving or is about to receive the multicast/broadcast service in the second message as a binary status flag (block 1020).

The first message may include an indication of a unicast capability, in response to the UE supporting a unicast service only (block 1030). The first message may include an indication of a reduced unicast capability, in response to the UE supporting both the unicast service and the multicast/broadcast service (block 1032). The unicast capability may range from a category 1 to a category 8 (block 1034). The unicast capability may be downgraded by at least one predetermined level, in response to the UE receiving the multicast/broadcast service (block 1036).

With reference to FIG. 10B, the first message may include an indication of a multicast/broadcast capability, in response to the UE supporting the multicast/broadcast service only (block 1040). The first message may include an indication of a reduced multicast/broadcast capability, in response to the UE supporting both a unicast service and the multicast/broadcast service (block 1042). The multicast/broadcast capability may range from a category 1 to a category 8 (block 1044). The multicast/broadcast capability may be downgraded by at least one predetermined level, in response to the UE receiving a unicast service (block 1046).

Receiving the data (block 930) may involve receiving unicast data at a unicast data rate that takes into account (a) a broadcast data rate allocated for the multicast/broadcast service and (b) the first message (block 1050). The predetermined rules may relate to adjusting a downlink unicast transmission rate based on a downlink broadcast transmission rate, and/or may factor or take into consideration the one or more capabilities of the UE (block 1060).

Figure 11:
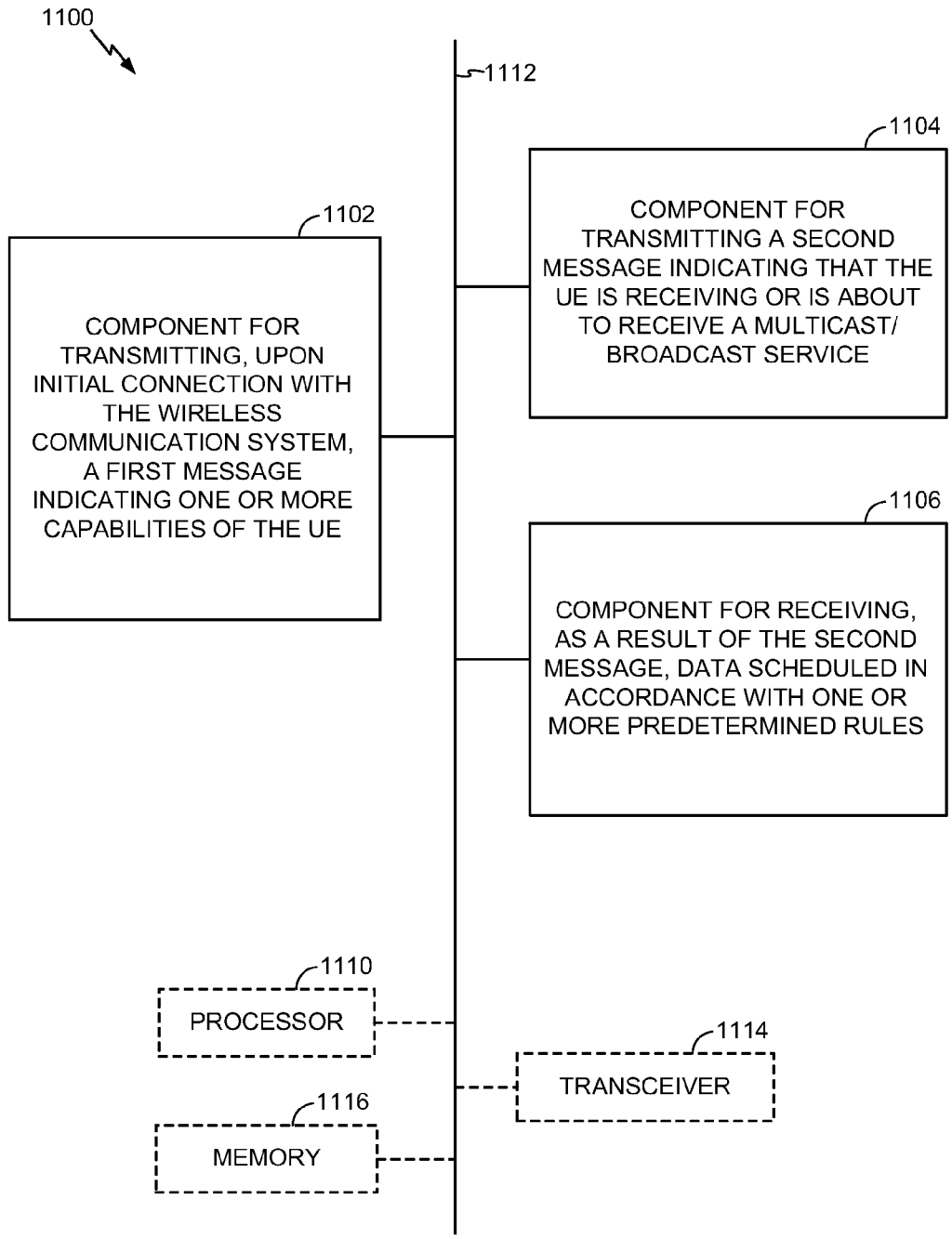
FIG. 11 illustrates an embodiment of an apparatus for managing simultaneous unicast and multicast/broadcast services, in accordance with the methodologies of FIGS. 9-10B.

In accordance with one or more aspects of the embodiments described herein, there are provided devices and apparatuses for managing simultaneous unicast and multicast/broadcast services, as described above with reference to FIGS. 9-10B. With reference to FIG. 11, there is provided an apparatus 1100 that may be configured as a mobile entity, or as a processor or similar device for use within the mobile entity. The apparatus 1100 may include functional blocks that can represent functions implemented by a processor, software, or combination thereof (e.g., firmware).

For example, the apparatus 1100 of FIG. 11 may include an electrical component or module 1102 for transmitting, upon initial connection with the wireless communication system, a first message indicating one or more capabilities of the UE. For example, the electrical component 1102 may include a simultaneous services detection module and/or at least one control processor coupled to a transmitter module and to a memory with instructions for detecting the capabilities of the UE. The electrical component 1102 may be, or may include, a means for transmitting, upon initial connection with the wireless communication system, a first message indicating one or more capabilities of the UE. Said means may be or may include at least one control processor and transmitter component(s) (e.g., the controller/processor 680, the transmit processor 664, and/or TX MIMO processor 666 of FIG. 2) operating an algorithm. In the alternative, or in addition, said means may be or may include the TX module 406 and the simultaneous services detection module 410 of FIG. 4 operating an algorithm. The algorithm may include, for example, transmitting a first message to a network entity in accordance with the processes of FIGS. 3A-C, FIGS. 10A-B, or variations thereof.

The apparatus 1100 may include an electrical component 1104 for transmitting a second message indicating that the UE is receiving or is about to receive a multicast/broadcast service. For example, the electrical component 1104 may include a simultaneous services reporting module and/or at least one control processor coupled to a transmitter module and to a memory with instructions for reporting a status change of the UE. The electrical component 1104 may be, or may include, a means for transmitting a second message indicating that the UE is receiving or is about to receive multicast/broadcast services. Said means may be or may include at least one control processor and transmitter component(s) (e.g., the controller/processor 680, the transmit processor 664, and/or TX MIMO processor 666 of FIG. 2) operating an algorithm. In the alternative, or in addition, said means may be or may include the TX module 406 and the simultaneous services reporting module 412 of FIG. 4 operating an algorithm. The algorithm may include, for example, transmitting a second message to a network entity in accordance with the processes of FIGS. 3A-C, FIGS. 13A-B, or variations thereof.

The apparatus 1100 may include an electrical component 1106 for receiving, as a result of the second message, data scheduled in accordance with one or more predetermined rules. For example, the electrical component 1106 may include a receiver module or the like. The electrical component 1106 may be, or may include, a means for receiving, as a result of the second message, data scheduled in accordance with one or more predetermined rules. Said means may be or may include receiver component(s) (e.g., the receive processor 658 and/or the MIMO detector 656 of FIG. 2). In the alternative, or in addition, said means may be or may include the RX module 408 of FIG. 4.

In related aspects, the apparatus 1100 may optionally include a processor component 1110 having at least one processor, in the case of the apparatus 1100 configured as a mobile entity, rather than as a processor. The processor 1110, in such case, may be in operative communication with the components 1102-1106 via a bus 1112 or similar communication coupling. The processor 1110 may effect initiation and scheduling of the processes or functions performed by electrical components 1102-1106.

In further related aspects, the apparatus 1100 may include radio transceiver component(s) 1114. For example, a stand alone receiver and/or stand alone transmitter may be used in lieu of or in conjunction with the transceiver 1114. The apparatus 1100 may optionally include a component for storing information, such as, for example, a memory device/component 1116. The computer readable medium or the memory component 1116 may be operatively coupled to the other components of the apparatus 1100 via the bus 1112 or the like. The memory component 1116 may be adapted to store computer readable instructions and data for effecting the processes and behavior of the components 1102-1106, and subcomponents thereof, or the processor 1110, or the methods disclosed herein. The memory component 1116 may retain instructions for executing functions associated with the components 1102-1106. While shown as being external to the memory 1116, it is to be understood that the components 1102-1106 can exist within the memory 1116.

In accordance with one or more aspects of the embodiments described herein, there is provided an another exemplary technique for simultaneous unicast and multicast/broadcast services in a wireless communication system. With reference to FIG. 9, illustrated is a methodology 1200 that may be performed by a network entity (e.g., an eNodeB or the like) in the wireless communication system. The method 1200 may involve, at 1210, receiving, from a UE, a first message indicating one or more capabilities of the UE upon initial connection of the UE with the wireless communication system. The method 1200 may involve, at 1220, receiving a second message from the UE indicating that the UE is receiving or is about to receive a multicast/broadcast service. The method 1200 may involve, at 1230, scheduling downlink data for the UE in accordance with one or more predetermined rules in response to the second message.

Figure 13A:
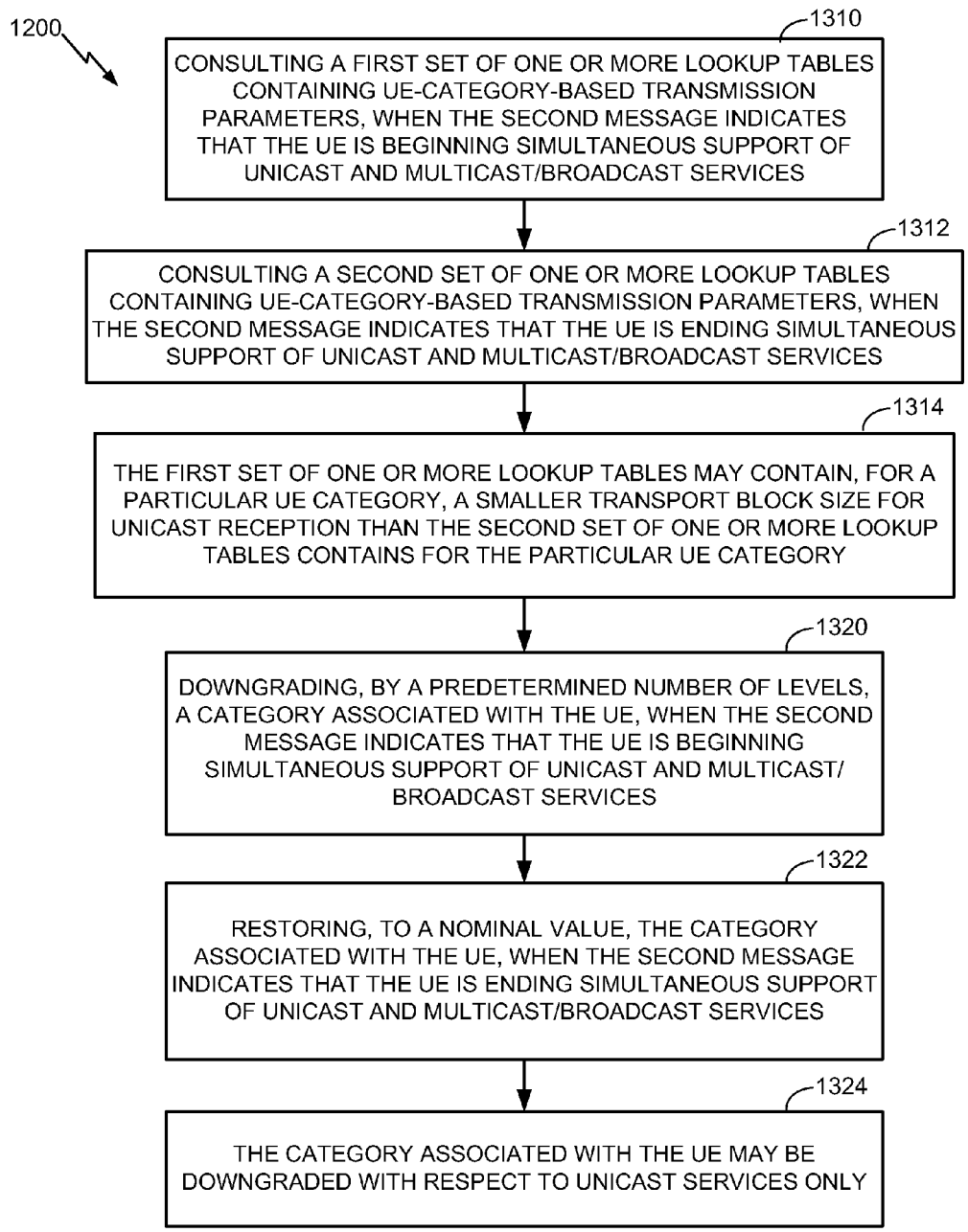
FIGS. 13A-B show further aspects of the methodology of FIG. 12.
Figure 13B:
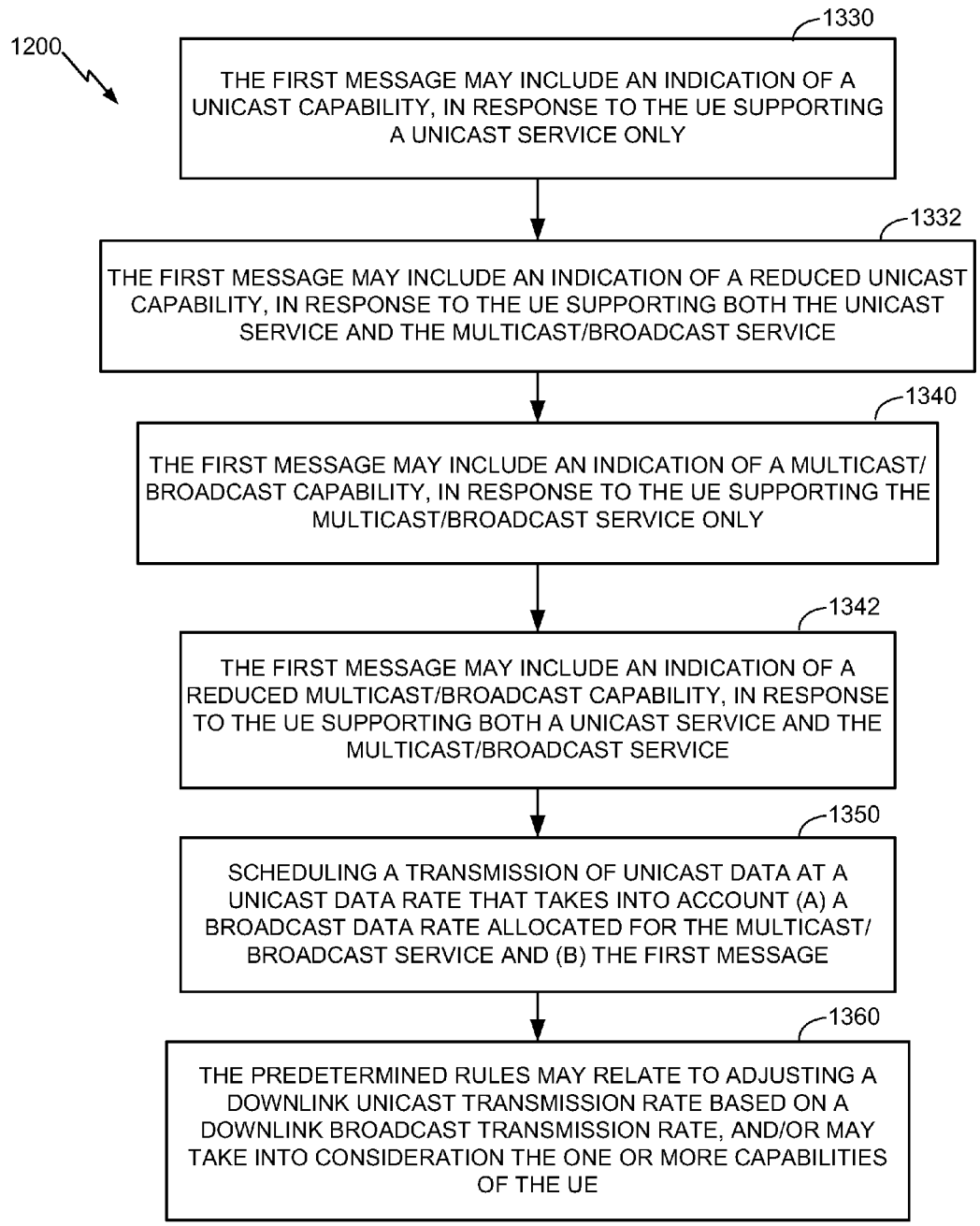

With reference to FIGS. 13A-B, there are shown further operations or aspects of the method 1200 that are optional and may be performed by the network entity for managing simultaneous unicast and multicast/broadcast services. It is noted that the blocks shown in FIGS. 13A-B are not required to perform the method 1200. If the method 1200 includes at least one block of FIGS. 13A-B, then the method 1200 may terminate after the at least one block, without necessarily having to include any subsequent downstream block(s) that may be illustrated. It is further noted that numbers of the blocks do not imply a particular order in which the blocks may be performed according to the method 1200. For example, with reference to FIG. 13A, the one or more predetermined rules include consulting a first set of one or more lookup tables containing UE-category-based transmission parameters, when the second message indicates that the UE is beginning simultaneous support of unicast and multicast/broadcast services (block 1310). The one or more predetermined rules include consulting a second set of one or more lookup tables containing UE-category-based transmission parameters, when the second message indicates that the UE is ending simultaneous support of unicast and multicast/broadcast services (block 1312). The first set of one or more lookup tables may contain, for a particular UE category, a smaller transport block size for unicast reception than the second set of one or more lookup tables contains for the particular UE category (block 1314).

The one or more predetermined rules include downgrading, by a predetermined number of levels, a category associated with the UE, when the second message indicates that the UE is beginning simultaneous support of unicast and multicast/broadcast services (block 1320). The one or more predetermined rules include restoring, to a nominal value, the category associated with the UE, when the second message indicates that the UE is ending simultaneous support of unicast and multicast/broadcast services (block 1322). The category associated with the UE may be downgraded with respect to unicast services only (block 1324). In related aspects, one or more of blocks 1320-1324 may be performed automatically.

With reference to FIG. 13B, the first message may include an indication of a unicast capability, in response to the UE supporting a unicast service only (block 1330). The first message may include an indication of a reduced unicast capability, in response to the UE supporting both the unicast service and the multicast/broadcast service (block 1332).

The first message may include an indication of a multicast/broadcast capability, in response to the UE supporting the multicast/broadcast service only (block 1340). The first message may include an indication of a reduced multicast/broadcast capability, in response to the UE supporting both a unicast service and the multicast/broadcast service (block 1342).

Scheduling the data (block 1230) may involve scheduling a transmission of unicast data at a unicast data rate that takes into account (a) a broadcast data rate allocated for the multicast/broadcast service and (b) the first message (block 1350). The predetermined rules may relate to adjusting a downlink unicast transmission rate based on a downlink broadcast transmission rate, and/or may take into consideration the one or more capabilities of the UE (block 1360).

Figure 12:
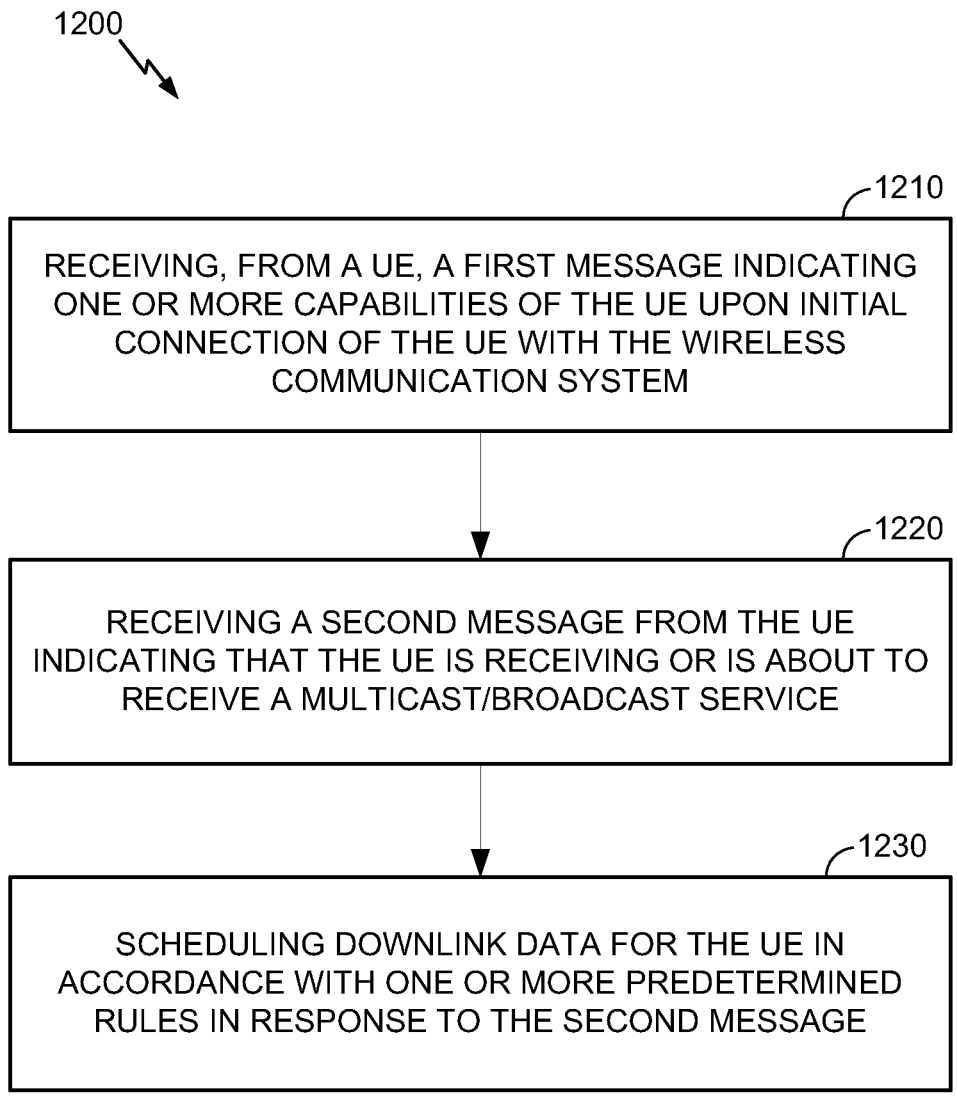
FIG. 12 illustrates an embodiment of a methodology for managing simultaneous unicast and multicast/broadcast services, operable by a network entity.
Figure 14:
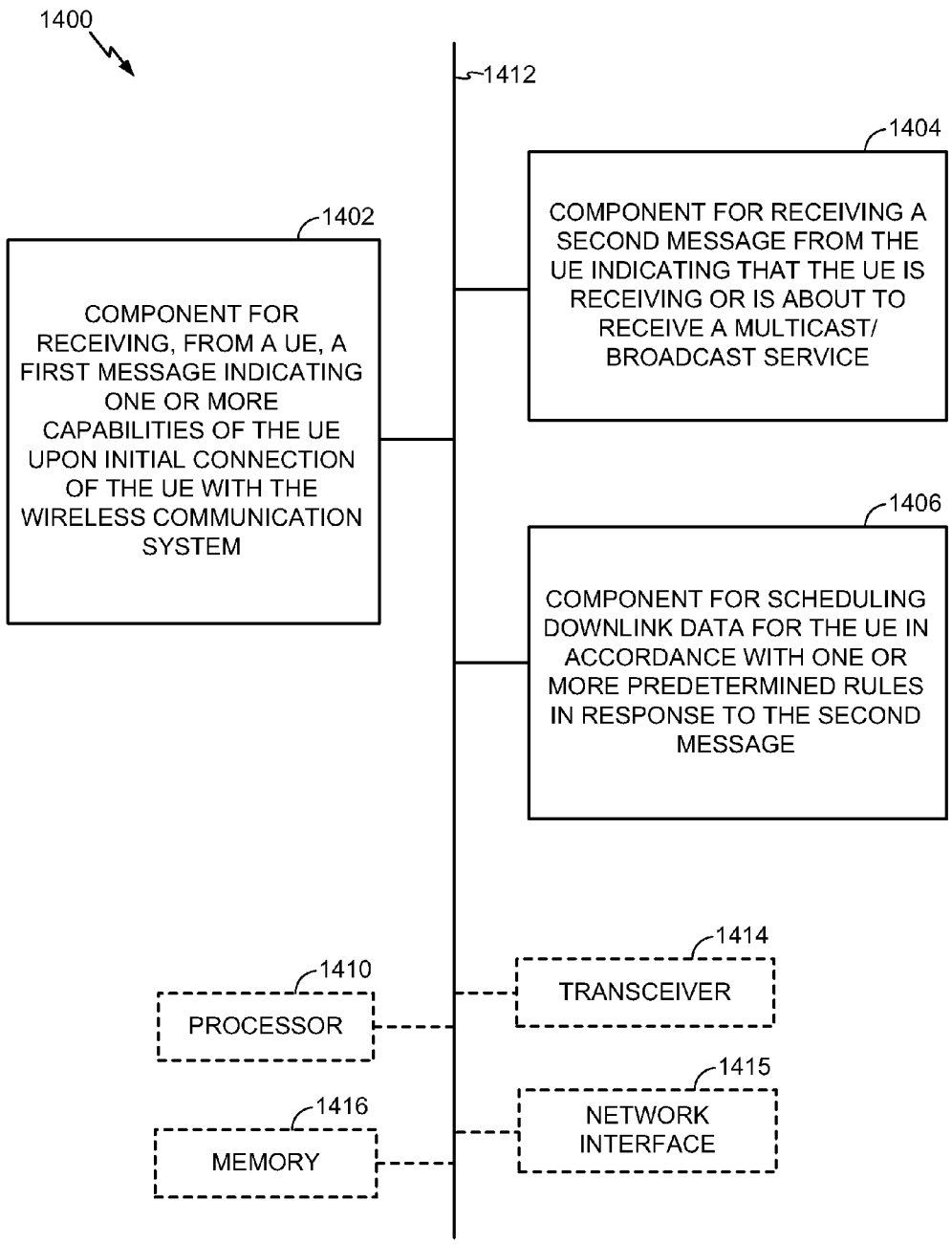
FIG. 14 illustrates an embodiment of an apparatus for managing simultaneous unicast and multicast/broadcast services, in accordance with the methodologies of FIGS. 12-13B.

In accordance with one or more aspects of the embodiments described herein, there are provided devices and apparatuses for managing simultaneous unicast and multicast/broadcast services, as described above with reference to FIGS. 12-13B. With reference to FIG. 14, there is provided an apparatus 1400 that may be configured as a network entity, or as a processor or similar device for use within the network entity. The apparatus 1400 may include functional blocks that can represent functions implemented by a processor, software, or combination thereof (e.g., firmware).

For example, the apparatus 1400 may include an electrical component or module 1402 for receiving, from a UE, a first message indicating one or more capabilities of the UE upon initial connection of the UE with the wireless communication system. For example, the electrical component 1402 may include a receiver module or the like. The electrical component 1402 may be, or may include, a means for receiving, from a UE, a first message indicating one or more capabilities of the UE upon initial connection of the UE with the wireless communication system. Said means may be or may include receiver component(s) (e.g., the receive processor 638 and/or the MIMO detector 636 of FIG. 2). In the alternative, or in addition, said means may be or may include the RX module 416 of FIG. 4.

The apparatus 1400 may include an electrical component 1404 for receiving a second message from the UE indicating that the UE is receiving or is about to receive a multicast/broadcast service. For example, the electrical component 1404 may include a receiver module or the like. The electrical component 1404 may be, or may include, a means for receiving a second message from the UE indicating that the UE is receiving or is about to receive multicast/broadcast services. Said means may be or may include receiver component(s) (e.g., the receive processor 638 and/or the MIMO detector 636 of FIG. 2). In the alternative, or in addition, said means may be or may include the RX module 416 of FIG. 4.

The apparatus 1400 may include an electrical component 1406 for scheduling downlink data for the UE in accordance with one or more predetermined rules in response to the second message. For example, the electrical component 1406 may include a scheduling module and/or at least one control processor coupled to a transmitter module and to a memory with instructions for scheduling downlink data. The electrical component 1406 may be, or may include, a means for scheduling downlink data for the UE in accordance with one or more predetermined rules in response to the second message. Said means may be or may include at least one control processor (e.g., the controller/processor 640, the scheduler 644, and/or the memory 642 of FIG. 2) operating an algorithm. In the alternative, or in addition, said means may be or may include the scheduling module 418 of FIG. 4 operating an algorithm. The algorithm may include, for example, scheduling downlink data in accordance with the processes of FIGS. 3A-C, FIGS. 13A-B, or variations thereof.

For the sake of conciseness, the rest of the details regarding apparatus 1400 are not further elaborated on; however, it is to be understood that the remaining features and aspects of the apparatus 1400 are substantially similar to those described above with respect to the apparatus 1100 of FIG. 11. It is noted, however, that the apparatus 1400 may be a network entity (e.g., an eNodeB or the like), whereas the apparatus 1100 may be mobile entity (e.g., a UE or the like). As such, the apparatus 1400 may additionally include a network interface component 1415 for interfacing with other network entities or the core network.

Referring once again to FIGS. 3A-3C, 5, 7, 9-10B, and 12-13B above, the order in which the various actions depicted in those figures are performed can vary from the above description, depending on the particular embodiment. Also, in some embodiments, actions may be divided into subordinate actions not shown in these figures. In other embodiments, actions shown in these figures may be combined into a single action. In still other embodiments, actions shown in these figures may be omitted, or actions not shown in these figures may be added. The description associated with FIGS. 3A-3C, 5, and 7 is not intended to be limiting in any of these respects.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or non-transitory wireless technologies, then the coaxial cable, fiber optic cable, twisted pair, DSL, or the non-transitory wireless technologies are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for operating a user equipment (UE) in a wireless communication system, the method comprising:
   transmitting, upon initial connection with the wireless communication system, a first message indicating one or more downlink capabilities of the UE including one or more of: (i) an indication of a unicast capability within a plurality of categories, and (ii) an indication of a multicast/broadcast capability within a plurality of categories;
   transmitting a second message indicating that the UE is receiving or is about to receive a multicast/broadcast service; and
   receiving, as a result of the first message and the second message, data scheduled in accordance with one or more predetermined rules.

2. The method of claim 1, wherein the UE appends the second message to a measurement report.

3. The method of claim 1, wherein the UE signals whether it is receiving or is about to receive the multicast/broadcast service in the second message as a binary status flag.

4. The method of claim 1, wherein the first message comprises the indication of the unicast capability, in response to the UE supporting a unicast service only.

5. The method of claim 4, wherein the first message comprises the indication of the unicast capability, in response to the UE supporting both the unicast service and the multicast/broadcast service concurrently.

6. The method of claim 5, wherein the unicast capability is downgraded by at least one predetermined level, in response to the UE receiving the multicast/broadcast service.

7. The method of claim 1, wherein the first message comprises the indication of the multicast/broadcast capability, in response to the UE supporting the multicast/broadcast service only.

8. The method of claim 7, wherein the first message comprises the indication of the multicast/broadcast capability, in response to the UE supporting both the unicast service and the multicast/broadcast service concurrently.

9. The method of claim 8, wherein the multicast/broadcast capability is downgraded by at least one predetermined level, in response to the UE receiving a unicast service.

10. The method of claim 1, wherein receiving the data comprises receiving unicast data at a unicast data rate that takes into account (a) a broadcast data rate allocated for the multicast/broadcast service and (b) the first message.

11. The method of claim 1, wherein the predetermined rules relate to adjusting a downlink unicast transmission rate based on a downlink broadcast transmission rate.

12. The method of claim 1, wherein the predetermined rules take into consideration the one or more capabilities of the UE.

13. An apparatus, comprising:
at least one processor configured to: transmit, upon initial connection with a wireless communication system, a first message indicating one or more downlink capabilities of a user equipment (UE) including one or more of: (i) an indication of a unicast capability within a plurality of categories, and (ii) an indication of a multicast/broadcast capability within a plurality of categories; transmit a second message indicating that the UE is receiving or is about to receive a multicast/broadcast service; and receive, as a result of the first message and the second message, data scheduled in accordance with one or more predetermined rules; and
a memory coupled to the at least one processor for storing data.

14. A method for operating by a network entity in a wireless communication system, the method comprising:
receiving, from a user equipment (UE), a first message indicating one or more downlink capabilities of the UE upon initial connection of the UE with the wireless communication system including one or more of: (i) an indication of a unicast capability within a plurality of categories, or (ii) an indication of a multicast/broadcast capability within a plurality of categories;
receiving a second message from the UE indicating that the UE is receiving or is about to receive a multicast/broadcast service; and
scheduling downlink data for the UE in accordance with one or more predetermined rules in response to the first message and the second message.

15. The method of claim 14, wherein the one or more predetermined rules include:
consulting a first set of one or more lookup tables containing UE-category-based transmission parameters, when the second message indicates that the UE is beginning concurrent support of unicast and multicast/broadcast services; and
consulting a second set of one or more lookup tables containing UE-category-based transmission parameters, when the second message indicates that the UE is ending concurrent support of unicast and multicast/broadcast services.

16. The method of claim 15, wherein the first set of one or more lookup tables contains, for a particular UE category, a smaller transport block size for unicast reception than the second set of one or more lookup tables contains for the particular UE category.

17. The method of claim 14, wherein the one or more predetermined rules include:
downgrading, by a predetermined number of levels, a category associated with the UE, when the second message indicates that the UE is beginning concurrent support of unicast and multicast/broadcast services; and
restoring, to a nominal value, the category associated with the UE, when the second message indicates that the UE is ending concurrent support of unicast and multicast/broadcast services.

18. The method of claim 17, wherein the category associated with the UE is downgraded with respect to unicast services only.

19. The method of claim 14, wherein the first message comprises the indication of the unicast capability, in response to the UE supporting the unicast service only.

20. The method of claim 19, wherein the first message comprises the indication of the unicast capability, in response to the UE supporting both the unicast service and the multicast/broadcast service concurrently.

21. The method of claim 14, wherein the first message comprises the indication of the multicast/broadcast capability, in response to the UE supporting the multicast/broadcast service only.

22. The method of claim 19, wherein the first message comprises the indication of the multicast/broadcast capability, in response to the UE supporting both a unicast service and the multicast/broadcast service concurrently.

23. The method of claim 14, wherein scheduling the data comprises scheduling a transmission of unicast data at a unicast data rate that takes into account (a) a broadcast data rate allocated for the multicast/broadcast service and (b) the first message.

24. The method of claim 14, wherein the predetermined rules relate to adjusting a downlink unicast transmission rate based on a downlink broadcast transmission rate.

25. The method of claim 14, wherein the predetermined rules take into consideration the one or more capabilities of the UE.

26. The method of claim 14, wherein the network entity comprises an eNodeB.

27. An apparatus, comprising:
at least one processor configured to: receive, from a user equipment (UE), a first message indicating one or more downlink capabilities of the UE upon initial connection of the UE with a wireless communication system including one or more one of: (i) an indication of a unicast capability within a plurality of categories, or (ii) an indication of a multicast/broadcast capability within a plurality of categories; receive a second message from the UE indicating that the UE is receiving or is about to receive a multicast/broadcast service; and schedule downlink data for the UE in accordance with one or more predetermined rules in response to the first message and the second message; and
a memory coupled to the at least one processor for storing data.

* * * * *